United States Patent
Yamamoto et al.

(10) Patent No.: US 7,470,878 B2
(45) Date of Patent: Dec. 30, 2008

(54) HIGH-FREQUENCY THAWING APPARATUS AND THAWING METHOD WITH ELECTRODES

(75) Inventors: Yasuji Yamamoto, Takarazuka (JP); Toshihiro Imahori, Osaka (JP)

(73) Assignee: Yamamoto Vinita Co., Ltd. (JP)

( * ) Notice: Subject to any disclaimer, the term of this patent is extended or adjusted under 35 U.S.C. 154(b) by 0 days.

(21) Appl. No.: 11/795,881

(22) PCT Filed: Aug. 10, 2006

(86) PCT No.: PCT/JP2006/015861

§ 371 (c)(1),
(2), (4) Date: Jul. 24, 2007

(87) PCT Pub. No.: WO2007/072606

PCT Pub. Date: Jun. 27, 2007

(65) Prior Publication Data

US 2008/0105672 A1    May 8, 2008

(30) Foreign Application Priority Data

Dec. 21, 2005   (JP) ............................. 2005-367639

(51) Int. Cl.
*H05B 6/54* (2006.01)
*A23L 3/365* (2006.01)
*F24C 7/02* (2006.01)

(52) U.S. Cl. ...................... 219/771; 219/776; 219/780; 99/451; 99/358; 426/244; 426/524

(58) Field of Classification Search ......... 219/770–780; 99/451, DIG. 14, 358; 426/234, 241, 243, 426/244, 523, 524
See application file for complete search history.

(56) References Cited

U.S. PATENT DOCUMENTS

| | | | | |
|---|---|---|---|---|
| 4,303,820 A | * | 12/1981 | Stottmann et al. | 219/771 |
| 4,320,276 A | * | 3/1982 | Takeuchi et al. | 219/771 |
| 4,974,503 A | * | 12/1990 | Koch | 99/451 |
| 6,247,395 B1 | | 6/2001 | Yamamoto | |

FOREIGN PATENT DOCUMENTS

| | | |
|---|---|---|
| JP | 55-156581 | 12/1980 |
| JP | 5-15792 | 3/1993 |
| JP | 8-266257 | 10/1996 |
| WO | WO 00/51450 | 9/2000 |

* cited by examiner

*Primary Examiner*—Philip H Leung
(74) *Attorney, Agent, or Firm*—Gerald E. Hespos; Anthony J. Casella

(57) ABSTRACT

Thawing is achieved by applying high-frequency power to a frozen material (R) sandwiched between opposing electrodes. A thawing section of a thawing apparatus (10) includes unit electrodes (302) for a first electrode group as a former stage, unit electrodes (303) for a second electrode group as a latter stage, and unit electrodes (304) for a third electrode group as a further stage. The unit electrodes (302) for the first electrode group are set so that the area of the electrode surface is smaller than the area of the sandwiched surface of the frozen material (R). The unit electrodes (303) for the second top electrode group are larger than the area of the unit electrodes (302) for the first electrode group. The unit electrodes (304) for the third electrode group are larger than the area of the unit electrodes (303) for the second electrode group.

8 Claims, 11 Drawing Sheets

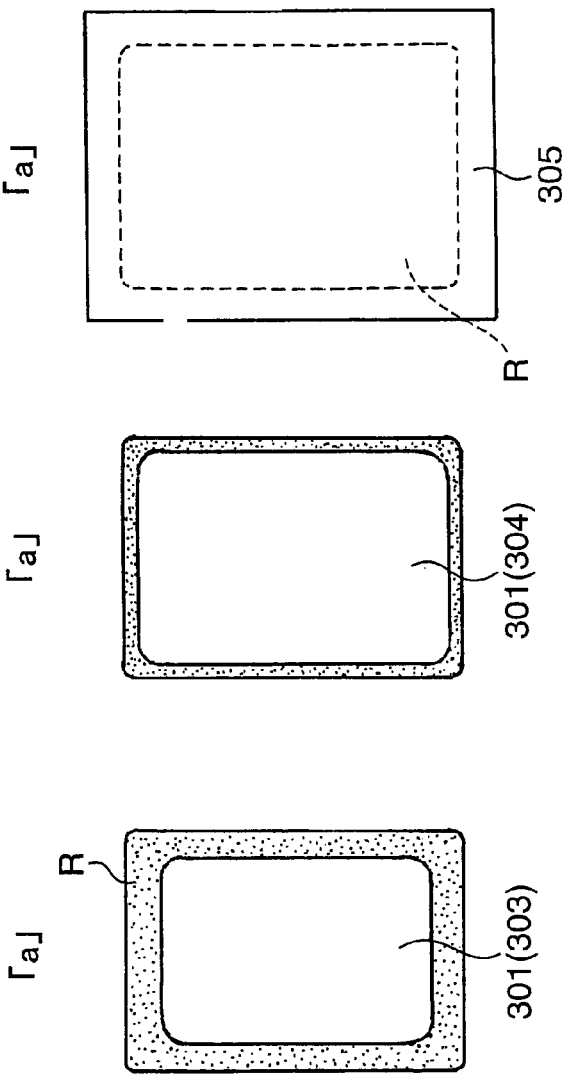
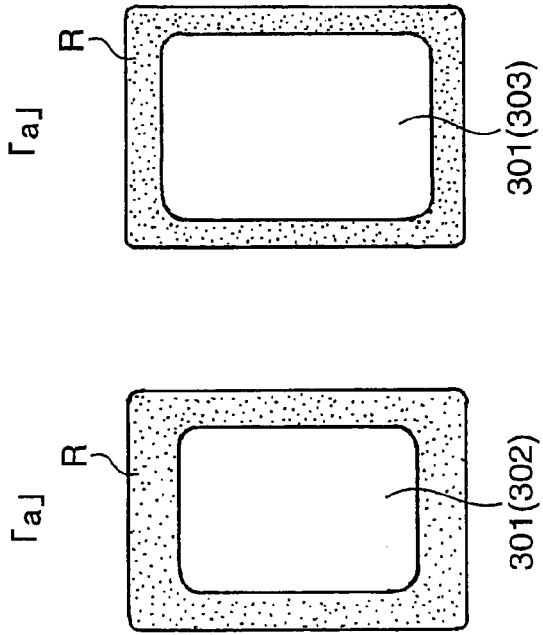
FIG. 4A FIG. 4B FIG. 4C FIG. 4D

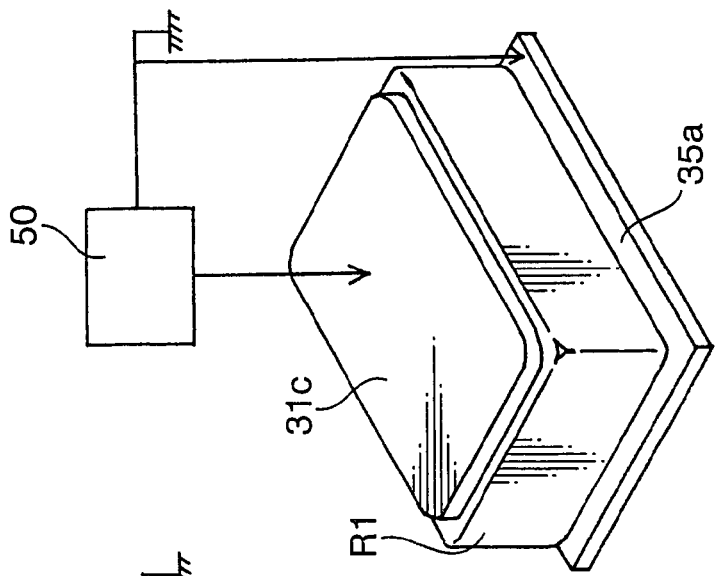
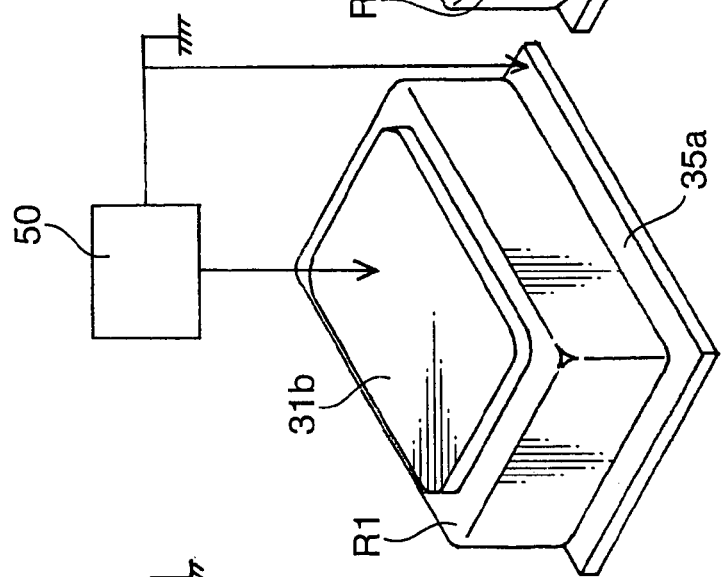
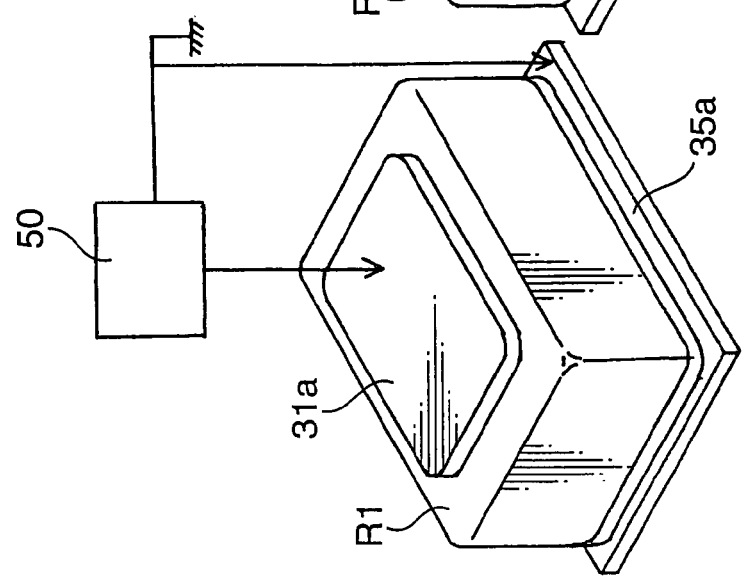

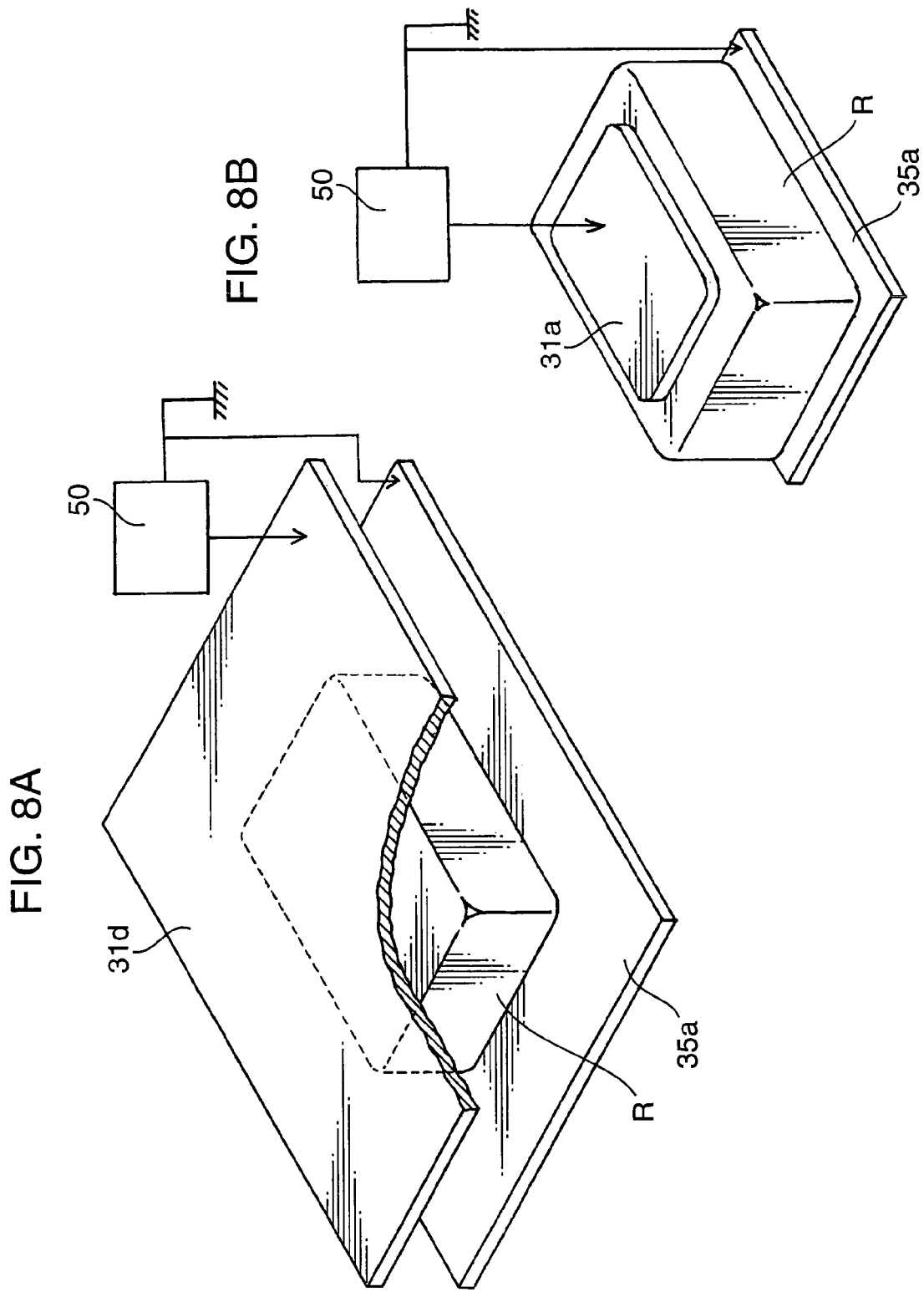

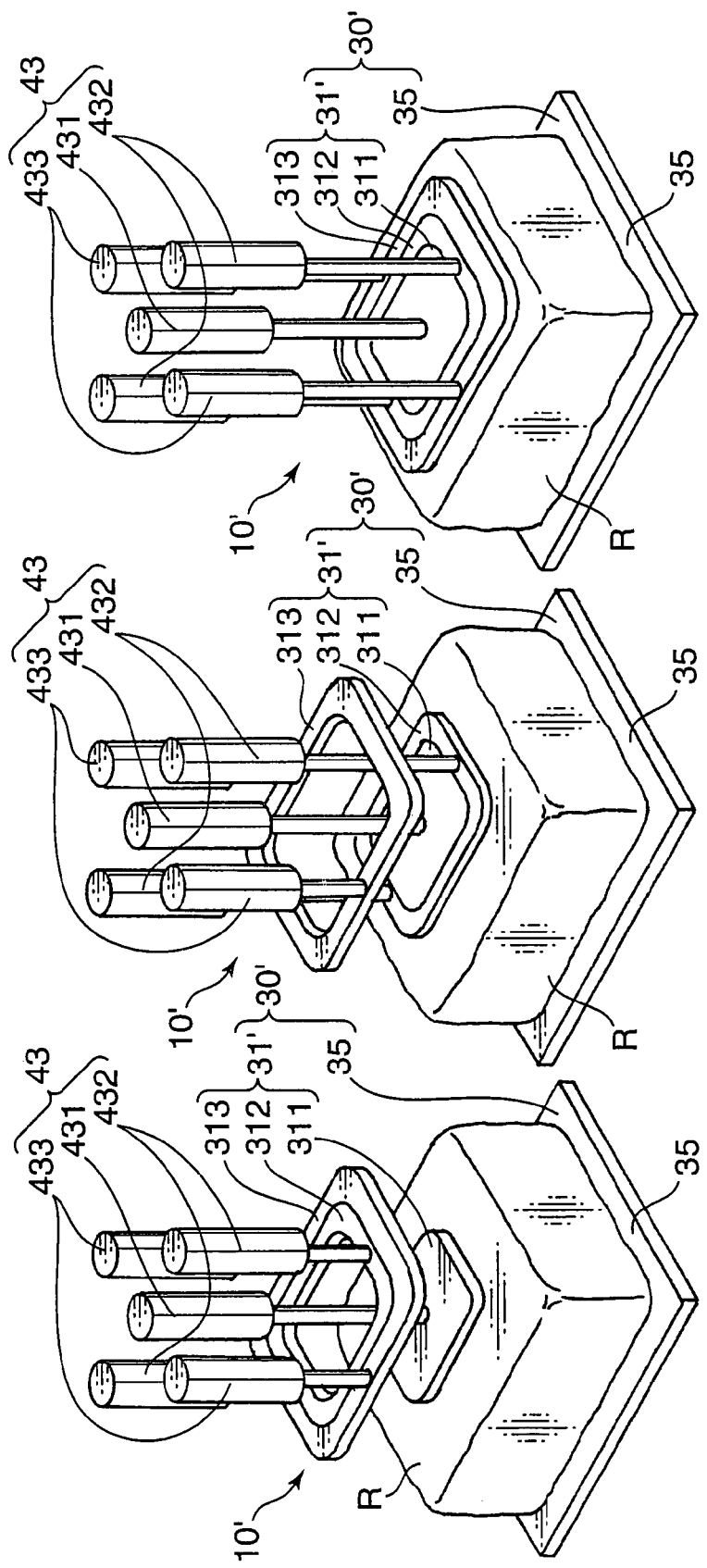

FIG. 11A
(EXAMPLE)

⌈a⌋

| -3.5 | -4.1 | -3.8 | -4.3 | -3.0 |
|---|---|---|---|---|
| -3.7 | -3.2 | -3.1 | -3.2 | -4.0 |
| -4.0 | -2.9 | -3.0 | -3.0 | -3.8 |
| -3.5 | -2.9 | -2.8 | -3.3 | -4.4 |
| -4.8 | -3.3 | -4.2 | -4.2 | -4.1 |

⌈b⌋

| -4.2 | -3.5 | -3.2 | -4.2 | -4.3 |
|---|---|---|---|---|
| -4.8 | -3.9 | -3.5 | -3.6 | -5.1 |
| -4.0 | -4.2 | -4.1 | -3.4 | -5.0 |
| -5.1 | -4.0 | -3.8 | -3.9 | -4.4 |
| -4.7 | -4.8 | -5.0 | -4.7 | -4.0 |

FIG. 11B
(COMPARATIVE EXAMPLE 1)

⌈a⌋

| +5.5 | -0.2 | +0.8 | -3.3 | -2.0 |
|---|---|---|---|---|
| +31.8 | -4.2 | -3.1 | -2.0 | -1.9 |
| +2.0 | -2.0 | -1.8 | -4.0 | -3.5 |
| +1.5 | -2.0 | -1.8 | -3.3 | -2.4 |
| +14.4 | +12.2 | -2.0 | -2.8 | -4.0 |

⌈b⌋

| +4.6 | -2.9 | -3.4 | -3.3 | -3.0 |
|---|---|---|---|---|
| +20.8 | -4.1 | -5.2 | -5.9 | -3.2 |
| -2.7 | -4.8 | -5.0 | -4.8 | -3.0 |
| -3.5 | -4.9 | -4.8 | -5.1 | -3.2 |
| +8.4 | +43.7 | -2.9 | -2.0 | -3.0 |

FIG. 11C
(COMPARATIVE EXAMPLE 2)

⌈a⌋

| -7.5 | -5.1 | -3.9 | -5.3 | -8.0 |
|---|---|---|---|---|
| -3.6 | -2.2 | -2.1 | -1.0 | -4.9 |
| -6.0 | -1.2 | -1.8 | -3.0 | -4.5 |
| -7.5 | -1.3 | -1.9 | -2.3 | -5.4 |
| -7.8 | -7.2 | -6.2 | -4.9 | -7.1 |

⌈b⌋

| -10.2 | -7.5 | -6.2 | -6.8 | -7.3 |
|---|---|---|---|---|
| -8.8 | -3.2 | -2.1 | -4.6 | -6.8 |
| -7.0 | -2.2 | -3.1 | -3.4 | -5.4 |
| -6.5 | -4.0 | -2.8 | -3.6 | -6.4 |
| -11.7 | -7.8 | -5.0 | -6.7 | -9.0 |

FIG. 11D
(COMPARATIVE EXAMPLE 3)

⌈a⌋

| -7.0 | -5.3 | -5.2 | -6.3 | -8.2 |
|---|---|---|---|---|
| -5.5 | +1.9 | -0.2 | -0.6 | -4.7 |
| -5.3 | +0.4 | -1.6 | +0.2 | -3.9 |
| -7.0 | +2.0 | +1.0 | +2.7 | -5.0 |
| -9.0 | -7.1 | -6.0 | -5.0 | -7.3 |

⌈b⌋

| -9.5 | -6.3 | -4.9 | -6.4 | -8.0 |
|---|---|---|---|---|
| -8.6 | -4.7 | -4.1 | -5.0 | -4.9 |
| -7.0 | -4.2 | -5.0 | -3.1 | -5.5 |
| -7.5 | -5.3 | -5.9 | -4.5 | -7.4 |
| -10.8 | -7.2 | -6.2 | -4.9 | -9.1 |

HIGH-FREQUENCY THAWING APPARATUS AND THAWING METHOD WITH ELECTRODES

BACKGROUND OF THE INVENTION

1. Field of the Invention

The present invention relates to a high-frequency thawing apparatus and a thawing method for executing thawing processing by applying high-frequency waves to a frozen material, such as meat and fish and seafood done with freezing processing.

2. Description of the Related Art

A high-frequency thawing apparatus that executes thawing processing by applying high-frequency waves to a frozen material, such as the one described in Patent Document 1, has been known. This high-frequency thawing apparatus is configured to supply a frozen material with high-frequency power from a high-frequency oscillator via a pair of opposing electrodes while the frozen material is sandwiched between the opposing electrodes, so that the frozen material sandwiched between the opposing electrodes is thawed by dielectric heating that takes place upon supply of high-frequency power.

Incidentally, the high-frequency thawing apparatus described in Patent Document 1 adopts a configuration to generate a uniform electric field within a material to be heated by covering a frozen material with a pair of opposing electrodes in a reliable manner. In a case of such opposing electrodes, however, energy of high frequency waves tends to concentrate on the boundary of a medium, that is, the crest edge portion of the frozen material, and this portion is heated more readily than the other portions, which poses a problem that the frozen material is not thawed uniformly.

In particular, in a case where the frozen material is meat, because the frozen material is heated by means of dielectric heating produced by high-frequency waves combined with a Joule heat on top of that the dielectric loss and the electric conductivity of fat contained in the meat are high, when the fat falls on the crest edge portion of the frozen meat, the crest edge portion of the thawed meat comes to a boil. This causes an inconvenience that the commercial value is declined.

Patent Document 1: Japanese Unexamined Patent Publication No. HEI EI 8-266257.

SUMMARY OF THE INVENTION

An object of the invention is to provide a high-frequency thawing apparatus and a thawing method which enables to apply thawing processing to a frozen material always uniformly and properly.

A high-frequency thawing apparatus according to an aspect of the invention executes thawing processing by means of dielectric heating by applying high-frequency power to a frozen material processed in a required thickness in a thawing section. The thawing section includes: first opposing electrodes whose at least one of electrodes to sandwich the frozen material has a shape of a plate in a size smaller than a shape of a sandwiched surface of the frozen material; second opposing electrodes whose at least one of electrodes to sandwich the frozen material has a shape of a plate in a size larger than the shape of the plate in the smaller size; and a high-frequency wave supply portion that supplies the frozen material with high-frequency power via the second opposing electrodes after the high-frequency power is supplied to the frozen material via the first opposing electrodes.

According to the high-frequency thawing apparatus of the invention, the processed frozen material is formed into a three dimensional shape having a required thickness, such as a substantially square prism or a cylindrical column of a specific dimension size determined in advance. Regarding the first opposing electrodes to sandwich such a frozen material, at least one of the electrodes is made to have a shape of a plate in a size smaller than the shape of the sandwiched surface of the frozen material. Hence, at the initial stage of the thawing processing, the crest edge portion of the frozen material is subjected to the thawing processing by high-frequency heating at a lower level than in the other portions by avoiding concentration of energy of high-frequency waves. It is thus possible to eliminate an inconvenience that the crest edge portion of the frozen material is overheated at the initial stage of the thawing processing and the thawed state becomes inhomogeneous. In addition, regarding the second opposing electrodes used in the second step of the thawing processing, because at lest one of the electrodes has a shape of a plate in a size larger than the shape of the plate in the smaller size of the first opposing electrodes, the crest edge portion of the frozen material is covered with the opposing electrodes almost completely or in a reliable manner. Hence, the crest edge portion of the frozen material that has not been thawed sufficiently by the first opposing electrodes is more readily heated than the other portions by this configuration combined with concentration of energy of high-frequency waves. The frozen material can be therefore thawed uniformly in a state where there is no significant variance in the thawing temperature when the thawing processing by high-frequency heating is completed.

BRIEF DESCRIPTION OF THE DRAWINGS

FIG. 4A is a plan view showing the dimension of a unit electrode for a first top electrode group when viewed from top;

FIG. 4B is a plan view showing the dimension of a unit electrode for a second top electrode group when viewed from top;

FIG. 4C is a plan view showing the dimension of a unit electrode for a third top electrode group when viewed from top; and FIG. 4D is a reference view for comparison.

FIG. 7A is a perspective explanatory view showing a thawing processing by a first step of high-frequency application, FIG. 7B is a perspective explanatory view showing a thawing processing by a second step of high-frequency application, and FIG. 7C is a perspective explanatory view showing a thawing processing by a third step of high-frequency application.

FIG. 8A is a perspective explanatory view showing a thawing processing by high-frequency application in Comparative Example 1, and FIG. 8B is a perspective explanatory view showing a thawing processing by high-frequency application in Comparative Examples 2 and 3.

FIG. 9A is a perspective explanatory view showing a state where a first top electrode alone is placed oppositely to a frozen material at a specific interval in the high-frequency thawing apparatus of a first embodiment adopting the frozen material stationary method, FIG. 9B is a perspective explanatory view showing a state where the first top electrode and a second top electrode are placed oppositely to the frozen material at a specific interval in the high-frequency thawing apparatus of the first embodiment adopting the frozen material stationary method, and FIG. 9C is a perspective explanatory view showing a state where the first top electrode, the second top electrode, and a third top electrode are placed oppositely to the frozen material at a specific interval in the high-frequency thawing apparatus of the first embodiment adopting the frozen material stationary method.

FIG. 11A is a table showing a temperature distribution of Example immediately after the thawing processing is completed in the form of numerical values, FIG. 11B is a table showing a temperature distribution of Comparative Example 1 immediately after the thawing processing is completed in the form of numerical values, FIG. 11C is a table showing a temperature distribution of Comparative Example 2 immediately after the thawing processing is completed in the form of numerical values, and FIG. 11D is a table showing a temperature distribution of Comparative Example 3 immediately after the thawing processing is completed in the form of numerical values, where a subscript "a" written next to FIG. 11A through FIG. 11D indicates that the drawing shows a temperature distribution of the surface layer and a subscript "b" indicates that the drawing shows a temperature distribution of the center portion in the vertical direction.

DETAILED DESCRIPTION OF THE PREFERRED EMBODIMENTS

Figure 1:
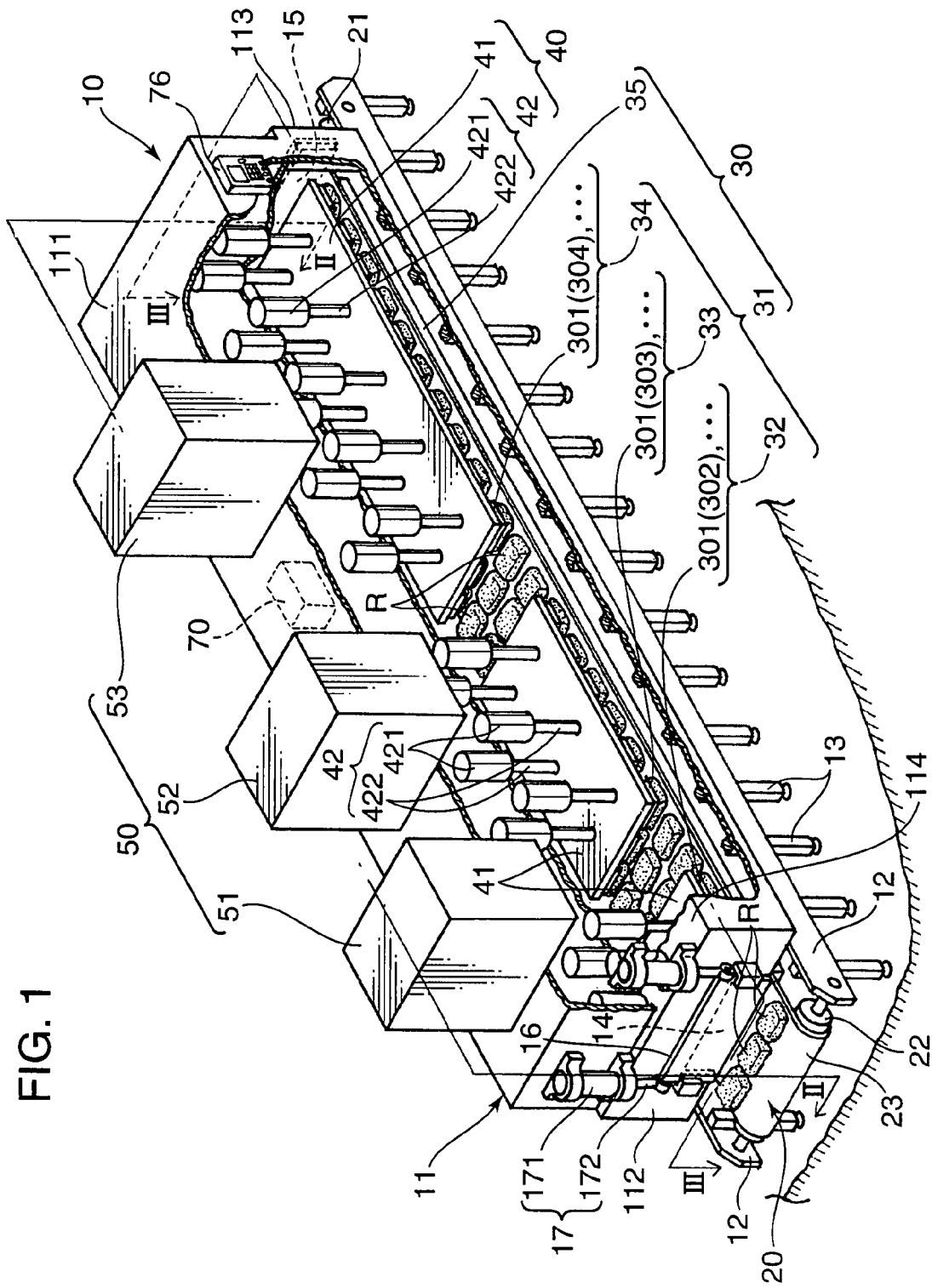
FIG. 1 is a perspective view showing a high-frequency thawing apparatus according to an embodiment of the invention.
Figure 2:
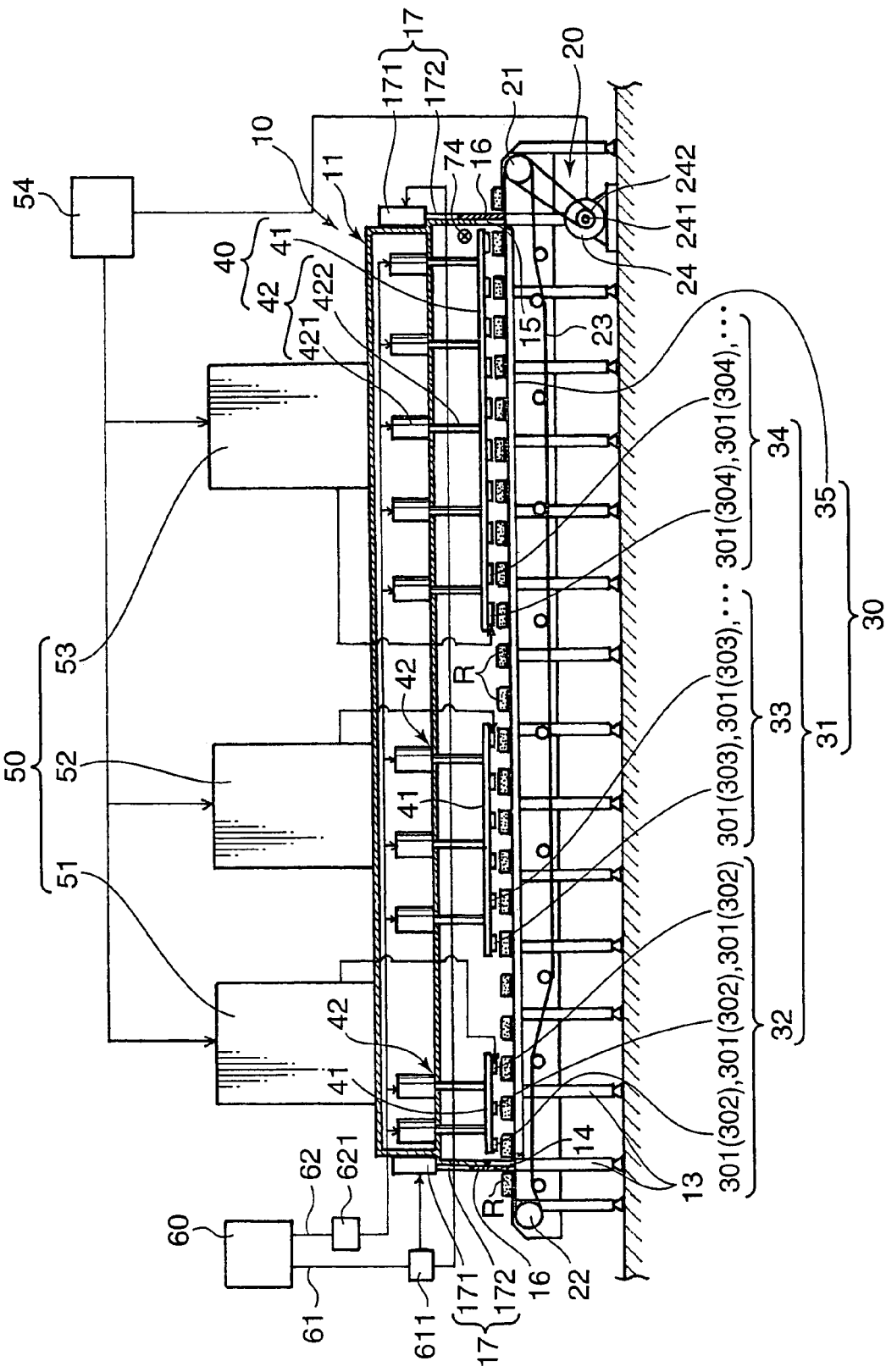
FIG. 2 is a cross section of the high-frequency thawing apparatus taken along the line II-II of FIG. 1.
Figure 3:
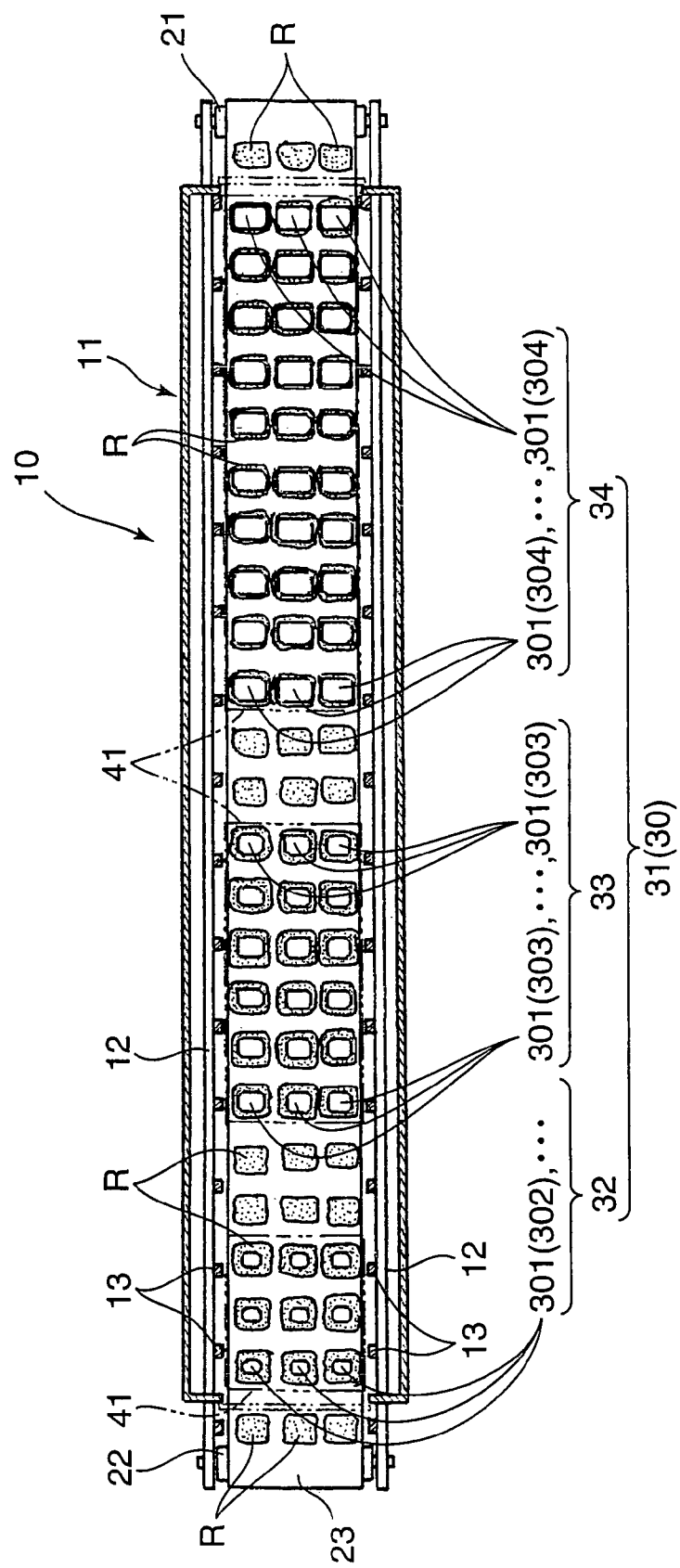
FIG. 3 is a cross section of the high-frequency thawing apparatus taken along the line III-III of FIG. 1.

FIG. 1 is a perspective view showing a high-frequency thawing apparatus according to an embodiment of the invention. FIG. 2 is a cross section of the high-frequency thawing apparatus taken along the line II-II of FIG. 1. FIG. 3 is a cross section of the high-frequency thawing apparatus taken along the line III-III of FIG. 1.

As shown in FIG. 1, a high-frequency thawing apparatus 10 includes: a carrier mechanism (carrier means) 20 that carries a frozen material R into an apparatus main body 11 of a box shape lengthened in the front-back direction (right-left direction of FIG. 1) from the front end to the rear end of the apparatus main body 11; opposing electrodes 30 disposed oppositely at top and bottom to apply high-frequency waves to the frozen material R carried by the carrier mechanism 20; an elevation mechanism 40 that moves up and down an electrode (first through third top electrode groups 32, 33, and 34 described below), which is one of the opposing electrodes 30 provided at the top; and a high-frequency oscillator (high-frequency wave supply portion) 50 provided onto a top board 111 of the apparatus main body 11.

A thawing section of the invention includes the carrier mechanism 20, the opposing electrodes 30, and the high-frequency oscillator 50.

In order to support the carrier mechanism 20, the apparatus main body 11 has a crosswise pair of supporting frames 12 extending in the front-back direction at the bottom portion thereof. Each supporting frame 12 has a front-back length longer than the length of the apparatus main body 11, and each has plural supporting columns 13 provided to protrude downward at regular pitches over the full length in the longitudinal direction. A front wall 112 of the apparatus main body 11 is provided with a carry-in port 14 which is a notch running upward from the bottom edge portion. The carry-in port 14 is adapted for carrying the frozen material R into the apparatus main body 11. A back wall 113 of the apparatus main body 11 is provided with a carry-out port 15 of a shape similar to that of the carry-in port 14. The carry-out port 15 is adapted for carrying out the frozen material R from the inside to the outside of the apparatus main body 11.

Each of the carry-in port 14 and the carry-out port 15 is provided with a partition board 16 configured to be capable of moving up and down and opening and closing means 17 for opening and closing the carry-in port 14 or carry-out port 15 by moving up and down the partition board 16. The opening and closing means 17 includes a crosswise pair of opening and closing air cylinders 171 provided in a portrait orientation at the upper position of the front wall 112 and the back wall 113, and a piston rod 172 that travels forward and backward in a downward direction from each opening and closing air cylinder 171. The lower end portion of each piston rod 172 is coupled to the partition board 16, so that the carry-in port 14 and the carry-out port 15 are opened and closed as the piston rods 172 move up and down with respect to the opening and closing air cylinders 171.

A control device 70 formed of a micro computer is disposed at an appropriate position in the apparatus main body 11. In addition, a console panel 76 for input operations of the operating conditions of the high-frequency thawing apparatus 10 is provided at an appropriate position on the outside wall of the apparatus main body 11. The control device 70 sets the operating conditions on the basis of operation information inputted via the console panel 76, and outputs a control signal according to the operating conditions to related equipment. The high-frequency thawing apparatus 10 is configured to operate properly as the related equipment is driven by the control signal.

As shown in FIG. 2, the carrier mechanism 20 includes: a drive roller 21 that is concentric with a drive roller shaft 211 installed between the front ends of the pair of supporting frames 12 and axially supported thereon to be able to rotate as one piece; a driven roller 22 that is concentric with a driven roller shaft 221 installed between the rear ends of the pair of supporting frames 12 and axially supported thereon to be free to rotate; a carrying belt 23 stretched over the drive roller 21 and the driven roller 22; a driving motor 24 that is disposed below the drive roller 21 and transmits a driving force to the drive roller 21; and a driving belt 25 stretched over a drive pulley 242 that is concentric with a driving shaft 241 of the driving motor 24 and externally fitted thereto to be able to rotate as one piece and the drive roller 21. The frozen material R is moved and placed on the upstream end (front end) of the carrying belt 23 by delivery means, such as a work robot, while the carry-in port 14 is opened by an ascent of the partition board 16. The frozen material R is then carried into the apparatus main body 11 as the carrying belt 23 is turned around between the drive roller 21 and the driven roller 22 by the driving of the driving motor 24.

In order to enable opening and closing actions of the carry-in port 14 and the carry-out port 15 and elevation actions of the first through third top electrode groups 32, 33, and 34 forming the counter electrode 30 and described below, the driving motor 24 is configured to be driven at specific timings. More specifically, a frozen material R supplied from upstream is carried into a thawing space V inside the apparatus main body 11 by the driving of the driving motor 24 while the carry-in port 14 and the carry-out port 15 are opened and the first through third top electrode groups 32, 33, and 34 are moved up, and at the same time a frozen material R done with the thawing processing is carried out from the thawing space V to the outside.

It is configured in such a manner that the thawing processing is executed as high-frequency power from the high-frequency oscillator 50 is supplied to a frozen material R carried into the thawing space V via a top electrode 31 that has descended to a position spaced apart by a specific distance, for example, 5 mm to 10 mm, from the top surface of the frozen material R while the driving motor 24 is suspended intermittently. In other words, the frozen material R is moved intermittently within the thawing space V by the intermittent driving of the driving motor 24, so that it is subjected to high-frequency power supply processing while the driving motor 24 is suspended.

The descended top electrode 31 is brought into a state where it is spaced apart by the specific distance from the top surface of the frozen material R by taking into account the presence of a variance in thickness of the frozen material R. More specifically, in a case where it is configured in such a manner that the top electrode 31 abuts on the top surface of the frozen material R, the top electrode 31 abuts on the top surface of the frozen material R only in part due to the variance in thickness. High-frequency power is therefore supplied intensively only to the portion on which the top electrode 31 is abutting in the top surface of the frozen material R, which raises an inconvenience that this portion is overheated. In order to prevent the occurrence of such an inconvenience, in the invention, the top electrode 31 is spaced apart from the top surface of the frozen material R by a distance equal to or larger than a range of variance in thickness of the frozen material R. In this embodiment, the spaced-apart distance is set in a range of 5 mm to 10 mm. In the invention, however, the spaced-apart distance is not limited to 5 mm to 10 mm, and an adequate spaced-apart distance is set as the need arises by taking a variance in thickness into account.

The opposing electrodes 30 include the top electrode 31 provided at the top and a bottom electrode 35 provided at the bottom with the top turning portion (outgoing region) of the carrying belt 23 in between. The bottom electrode 35 has a width dimension substantially the same as the width dimension of the carrying belt 23 and also has a length dimension slightly shorter than the length dimension (front-back dimension) of the carrying belt 23. The top electrode 31 is formed by providing plural unit electrodes 301 successively from upstream (front end) to downstream. These unit electrodes 301 form a first top electrode group 32, a second top electrode group 33, and a third top electrode group 34 from upstream.

Each unit electrode 301 is of a rectangular shape when viewed from above and the four corners thereof are formed in the shape of a circular arc. This configuration prevents an event that energy concentrates on the four corners of the unit electrode 301 while high-frequency power is applied to the frozen material R via the unit electrode 301, thereby causing partial overheating at the corners. By comparison, when the corners of the unit electrode 301 are square, energy concentrates on the square portions and portions of the frozen material R opposing these square portions are overheated.

The first top electrode group 32 and the bottom electrode 35 form first opposing electrodes of the invention, and the second top electrode group 33 and the bottom electrode 35 form second opposing electrodes of the invention.

On the outgoing side of the carrying belt 23, a first thawing space V1 is defined between the first top electrode group 32 and the bottom electrode 35, a second thawing space V2 is defined between the second top electrode group 33 and the bottom electrode 35, and a third thawing space V3 is defined between the third top electrode group 34 and the bottom electrode 35. Curing spaces in which no high-frequency power is applied to the frozen material R are defined between the first thawing space V1 and the second thawing space V2 and between the second thawing space V2 and the third thawing space V3.

In this embodiment, the thawing space V (V1 through V3) is divided equally into three parts in the width direction as is indicated by phantom lines of FIG. 3 (shown as chain double-dashed lines in FIG. 3), and divided equally into 23 parts in the front-back direction. The first top electrode group 32 is formed of nine unit electrodes 301 disposed individually into a total of nine cells in three columns on the upstream end partitioned by the phantom line. The second top electrode group 33 is formed of 18 unit electrodes 301 disposed, by skipping six cells in two columns downstream from the first top electrode group 32, in six columns directly downstream from the skipped columns. The third top electrode group 34 is formed of 30 unit electrodes 301 disposed, by skipping six cells in two columns downstream from the second top electrode group 33, in ten columns directly downstream from the skipped columns.

Of the frozen materials R successively sent from the upstream process, three frozen materials R in one column are supplied to the upstream end of the carrying belt 23 and introduced into the thawing space V by the carrying belt 23 that performs intermittently a turning action for one cell at a time in a specific cycle. As the top electrode 31 moves up and down in synchronization with the introduction of the frozen materials R into the thawing space V, high-frequency waves are applied first to the frozen materials R sandwiched between the unit electrodes 301 in the first top electrode group 32 and the bottom electrode 35. High-frequency application is applied three times to the three frozen materials R in one column in the first top electrode group 32 by the intermittent turning actions of the carrying belt 23.

Subsequently, the three frozen materials R in one column, to which high-frequency application processing has been applied three times in specific cycles in the first top electrode group 32, are subjected to the curing processing (processing to make the temperature uniform through heat conduction inside the frozen materials R without applying high-frequency waves) for a time comparable to two specific cycles, after which they are subjected to high-frequency application processing six times in specific cycles in the second top electrode group 33.

Subsequently, the three frozen materials R in one column, to which the high-frequency application processing has been applied six times in specific cycles in the second top electrode group 33, are subjected to the curing processing for a time comparable to two specific cycles in the same manner as above, after which they are subjected to the high-frequency application processing ten times in specific cycles in the third top electrode group 34, whereupon the thawing processing is completed. The frozen materials R done with the thawing processing, three at a time, are carried out from the thawing space V to the outside.

The elevation mechanism 40 is adapted for moving up and down the top electrode 31. The elevation mechanism 40 includes an electrode supporting plate 41 made of metal to which plural unit electrodes 301 are attached to the lower surface, and plural cylinder devices 42 that move up and down the electrode supporting plate 41. The electrode supporting plate 41 is formed into a rectangular shape using an insulation material and a hard synthetic resin material, and it includes three kinds for the first top electrode group 32, the second top electrode group 33, and the third top electrode group 34.

The electrode supporting plate 41 for the first top electrode group 32 is made to have a dimension large enough to cover nine unit electrodes 301 arrayed in three rows and three columns. The electrode supporting plate 41 for the second top electrode group 33 is made to have a dimension large enough to cover 18 unit electrodes 301 arrayed in three rows and six columns. The electrode supporting plate 41 for the third top electrode group 34 is made to have a dimension large enough to cover 30 unit electrodes 301 arrayed in three rows and ten columns.

Each cylinder device 42 has an elevation air cylinder 421 provided in a portrait orientation and a piston rod 422 protruding from the elevation air cylinder 421 to be able to travel backward and forward in a downward direction. The elevation air cylinder 421 is fixed in a portrait orientation onto a shelf board 114 that partitions the interior of the apparatus main body 11 to top and bottom portions, and the piston rod 422 is provided to protrude downward by penetrating through the shelf board 114. The electrode supporting plate 41 is connected to the lower end portion of the piston rod 422. It is configured in such a manner that the electrode supporting plate 41 moves down or moves up as the piston rod 422 travels backward and forward with respect to the elevation air cylinder 421 by the driving of the cylinder device 42.

In this embodiment, the cylinder device 42 has four piston rods for the first top electrode group 32, six piston rods for the second top electrode group 33, and ten piston rods for the third top electrode group 34.

When high-frequency power is applied to the frozen materials R, the frozen material R is positioned between the top electrode 31 (unit electrode 301) at the lower end of the piston rod 422 moved down in the thawing space V by the driving of the corresponding cylinder device 42 and the bottom electrode 35 with the carrying belt 23 in between. Meanwhile, when the frozen materials R are carried inside the thawing space V, a spaced-apart distance between the top electrode 31 at the lower end of the piston rod 422 moved up by the driving of the corresponding cylinder device 42 and the top surface of the frozen material R is increased. The top electrode 31 is moved up when the frozen materials R are moved so as to avoid the occurrence of interference between the frozen materials R and the top electrode 31. However, in a case where the dimension accuracy of the frozen materials R is so high that irregularities are hardly present on the top surface, the top electrode 31 may be maintained at a specific height position set in advance without moving up or down the top electrode 31.

A compressed air source 60 is formed of a press pump, a pressure container to store compressed air, and so forth, and supplies driving compressed air to the elevation air cylinders 421 of the elevation mechanism 40 and the opening and closing air cylinders 171 of the opening and closing means 17. Compressed air from the compressed air source 60 passes through a first air tube 61 to be supplied to a pair of opening and closing air cylinders 171 via a first valve gear 611, while it passes through a second air tube 62 to be supplied to all the elevation air cylinders 421 via a second valve gear 621.

The first air tube 61 and the second air tube 62 are illustrated schematically in the drawing. In practice, however, the former is provided in a plural form to be headed toward the both end portions of the cylinders (the opening and closing air cylinders 171 and the elevation air cylinders 421) and equipped with tubes for air bleeding and various switching valves, and because these are conventional art, they are not shown in the drawing. The same can be said for the second air tube 62.

Also, plural control valves are adopted for the first valve gear 611 and the second valve gear 621, and it is configured in such a manner that the opening and closing action of the partition board 16 and the elevation action of the top electrode 31 are controlled by allowing the respective valves to perform the opening and closing actions in association with the other control valves. Because they are conventional art, too, they are not shown in the drawing.

In this embodiment, three oscillators, a first oscillator 51 for the first top electrode group 32, a second oscillator 52 for the second top electrode group 33, and a third oscillator 53 for the third top electrode group 34, are provided as the high-frequency oscillator 50. In this embodiment, the first through third oscillators 51, 52 and 53 have the same specification (that is, the same output). The invention, however, is not limited to the configuration in which the first through third oscillators 51, 52, and 53 all having the same output are adopted, and those having different outputs can be adopted as well.

A power supply device 54 is adapted for obtaining specific power from the commercial power supply, and supplies the first through third oscillators 51, 52, and 53 with power. It is configured in such a manner that the first oscillator 51 applies a high-frequency voltage to the respective unit electrodes 301 in the first top electrode group 32, the second oscillator 52 applies a high-frequency voltage to the respective unit electrodes 301 in the second top electrode group 33, and the third oscillator 53 applies a high-frequency voltage to the unit electrodes 301 in the third top electrode group 34.

Hence, because there are nine unit electrodes 301 in the first top electrode group 32, let Q (kW) be the output from one high-frequency oscillator 50, then power supplied to each unit electrode 301 is Q/9 (kW). Meanwhile, because there are 18 unit electrodes 301 in the second top electrode group 33, power supplied to each unit electrode 301 in the second top electrode group 33 is Q/18 (kW). Also, because there are 30 unit electrodes 301 in the third top electrode group 34, power supplied to each unit electrode 301 in the third top electrode group 34 is Q/30 (kW).

The above description indicates that an amount of power supplied to a single unit electrode 301 in the second top electrode group 33 is ½ (=(Q/18)÷(Q/9)) of the amount of power in the first top electrode group 32, and an amount of power supplied to a single unit electrode 301 in the third top electrode group 34 is about ⅓ (=(Q/30)÷(Q/9)) of the amount of power in the first top electrode group 32.

This power distribution makes it possible to prevent the frozen materials R from being overheated with a progress in the thawing processing by high-frequency application to the frozen materials R. It is thus possible to prevent the internal temperature distribution of the frozen materials R from becoming inhomogeneous.

FIG. 4 is a plan view showing dimensions of the unit electrodes 301 used in the first through third top electrode groups 32, 33, and 34. FIG. 4A shows a unit electrode 302 for the first top electrode group, FIG. 4B shows a unit electrode 303 for the second top electrode group, and FIG. 4C shows a unit electrode 304 for the third top electrode group. FIG. 4D is a reference view for comparison. A subscript "a" written next to FIG. 4A through FIG. 4D indicates that the drawing is a plan view and a subscript "b" indicates that the drawing is a side view.

In the invention, as shown in FIG. 4, the unit electrode 302 for the first top electrode group (FIG. 4A) has the smallest dimension among the three kinds of unit electrodes 301 when viewed from above, the unit electrode 303 for the second top electrode group (FIG. 4B) has the medium dimension among the three kinds, and the unit electrode 304 for the third top electrode group (FIG. 4C) has the largest dimension among the three kinds. FIG. 4D shows a case where a unit electrode 305 is larger than the frozen material R as a comparative example for reference purpose.

In this embodiment, a subject is a block of frozen material R having a dimension in length (right-left dimension), width (front-back dimension), and height (thickness dimension) of 530 mm×360 mm×170 mm. The unit electrode 302 for the first top electrode group is made to have the lengthwise and crosswise dimensions of 370 mm×250 mm. As shown in FIG. 4A, the crest edge portion on the top of a block of frozen material R lies off outward from the unit electrode 302 for the first top electrode group.

The unit electrode 303 for the second top electrode group is made to have the lengthwise and crosswise dimensions of 420 mm×280 mm. As shown in FIG. 4B, a lying-off amount of the crest edge portion on the top of a block of frozen material R from the unit electrode 303 for the second top electrode group is smaller than in the case of the unit electrode 302 for the first top electrode group.

The unit electrode 304 for the third top electrode group is made to have the lengthwise and crosswise dimensions of 480 mm×320 mm. As shown in FIG. 4C, a lying-off amount of the crest edge portion on the top of a block of frozen material R from the unit electrode 304 for the third top electrode group is extremely small.

The reason why the lying-off amounts are varied stepwise in this manner is as follows. That is, at the initial stage where the frozen material R is subjected to thawing processing by the first top electrode group 32, it is effective to execute the thawing processing quickly by supplying the frozen material R with a large amount of energy from the high-frequency oscillator 50 in terms of enhancing efficiency for the overall thawing processing. However, when configured as described above, as shown in FIG. 4Db, energy of high-frequency waves concentrates on the crest edge portion of the frozen material R, and the crest edge portion of the frozen material R is consequently overheated, which makes it impossible to thaw the frozen material R with a uniform temperature distribution.

In a case where the frozen material R is frozen meat, fat having high dielectric loss and electric conductivity and present in the crest edge portion of a block of frozen meat is readily subjected to dielectric heating and Joule heating, and this portion becomes a so-called boiled state. This causes an inconvenience that the commercial value of the thawed material is declined markedly.

Given these circumstances, as are shown in FIG. 4Aa through FIG. 4Ca, the unit electrodes 301 are configured in such a manner that the unit electrode 302 for the first top electrode group having the largest amount of energy conferred to the frozen material R per unit electrode 301 is made to have the smallest area, the unit electrode 303 for the second top electrode group having the second largest amount of energy conferred to the frozen material R per unit electrode 301 is made to be slightly larger than the unit electrode 302 for the first top electrode group, and the unit electrode 304 for the last third top electrode group set with the smallest amount of energy conferred to the frozen material R per unit electrode 301 is made to be the largest.

Hence, when the frozen material R is carried into the first thawing space V1 and sandwiched between the bottom electrode 35 and the unit electrode 302 for the first top electrode group via the carrying belt 23, as shown in FIG. 4Ab, energy (indicated by a dotted line for ease of illustration) supplied between the unit electrode 302 for the first top electrode group and the bottom electrode 35 flows while deviating considerably from the crest edge portion on the top of the frozen material R. Hence, even when a large amount of energy is supplied to the frozen material R during the initial stage of thawing, it is possible to prevent the crest edge portion of the frozen material R from being overheated in a reliable manner.

Incidentally, the frozen material R delivered from the upstream process at about −20° C. is heated to about −10° C. in the first thawing space V1.

Subsequently, because the frozen material R done with the thawing processing in the first thawing space V1 and sent into the second thawing space V2 has been heated to about −10° C., an amount of energy per unit time conferred to the frozen material R is reduced to about ½ the amount in the case of the first thawing space V1, so that the thawing processing is applied to the frozen material R gently over a longer time (about two times longer than the time in the case of the first thawing space V1).

Accordingly, in the second thawing space V2, although high-frequency waves are applied to the frozen material R by the unit electrode 303 for the second top electrode group having a slightly larger plane dimension than the unit electrode 302 for the first top electrode group in the first thawing space V1, the degree of concentration of energy to the crest edge portion of the frozen material R is not so high. Hence, not only is it possible to suppress overheating of the crest edge portion, but rather, it is also possible to apply the thawing processing to the crest edge portion by resolving a state of not having been heated in the first thawing space V1. Incidentally, the frozen material R delivered from the first thawing space V1 at about −10° C. is heated to about −5° C. in the second thawing space V2.

For the frozen material R done with thawing processing in the second thawing space V2 and sent into the third thawing space V3, an amount of energy per unit time conferred to the frozen material R is reduced to about ⅓ the amount in the case of the first thawing space V1, so that the thawing processing is applied to the frozen material R more gently over a further longer time (about three times longer than the time in the case of the first thawing space V1).

Hence, in the third thawing space V3, high-frequency waves are applied to the frozen material R by the unit electrode 304 for the third top electrode group having a considerably larger plane dimension than the unit electrode 303 for the second top electrode group in the second thawing space V2 and substantially the same lengthwise and crosswise dimensions as the frozen material R. However, because the energy of the high-frequency waves has become considerably low, the frozen material R is subjected to heating uniformly over a longer time thereafter.

Incidentally, the frozen material R delivered from the second thawing space V2 at about −5° C. is heated to about −3° C. in the third thawing space V3, and the thawing processing ends in this state.

Figure 5:
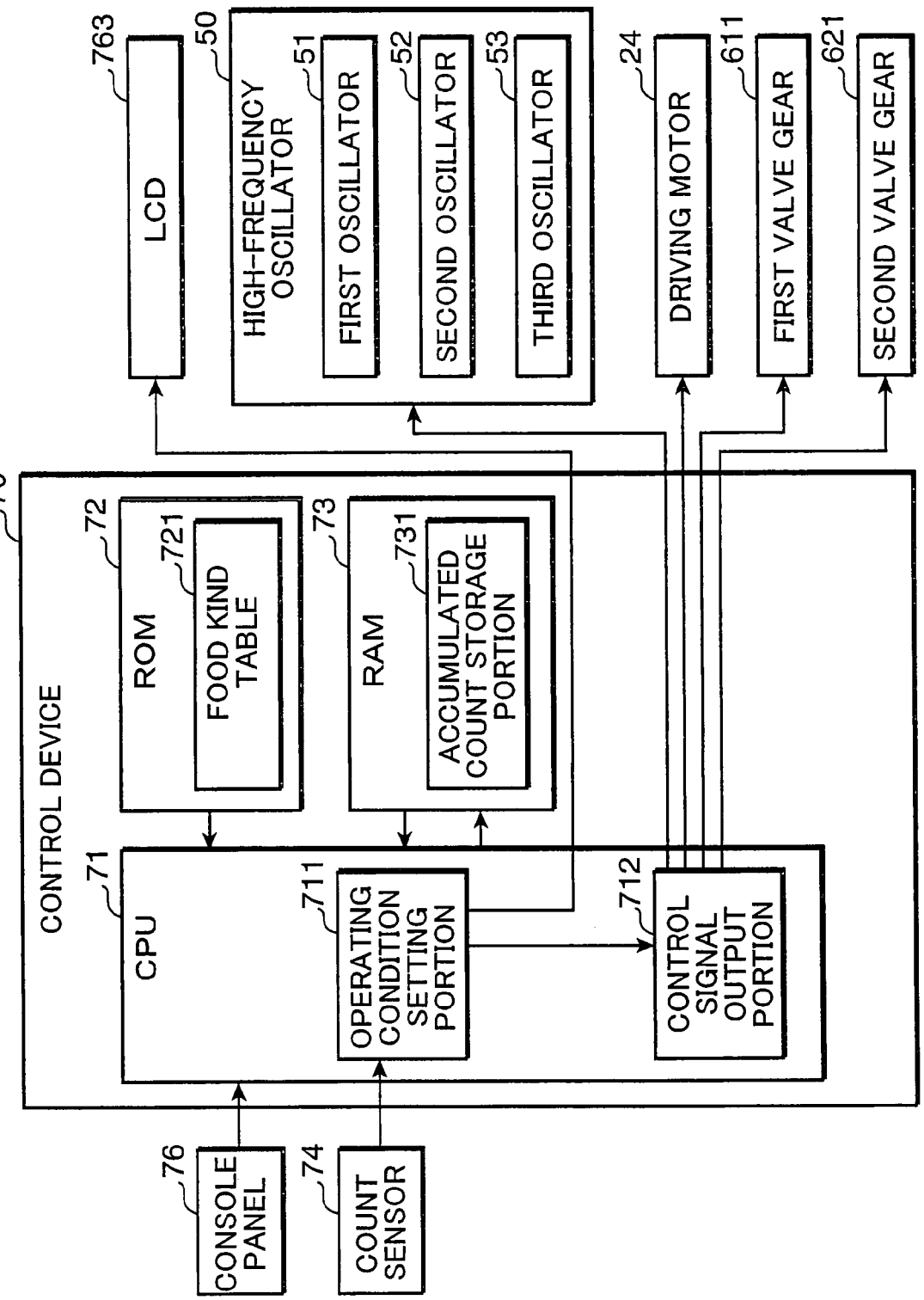
FIG. 5 is a block diagram showing an exemplary operation control of the high-frequency thawing apparatus.

FIG. 5 is a block diagram showing an exemplary operation control of the high-frequency thawing apparatus 10. The control device 70 formed of a micro computer to control operations of the high-frequency thawing apparatus 10 is provided to an appropriate position in the apparatus main body 11 (FIG. 1). As shown in FIG. 5, the control device 70 includes a CPU (central processing unit) 71 serving as an arithmetic processing unit as well as a ROM (read only memory) 72 and a RAM (random access memory) 73 both serving as a memory device provided to the CPU 71.

The ROM 72 is a read-only memory device and has stored a program to cause the control device 70 to function, invariable data, and so forth. The RAM 73 is used as an area to write in data used for a control action temporarily and read out the data later.

The CPU 71 includes an operating condition setting portion 711 that sets the operating conditions on the basis of operation information inputted from the console panel 76, and a control signal output portion 712 that outputs a control signal to the high-frequency oscillator 50, the driving motor 24, and the first and second valve gears 611 and 621 according to a command signal from the operating condition setting portion 711.

Figure 6:
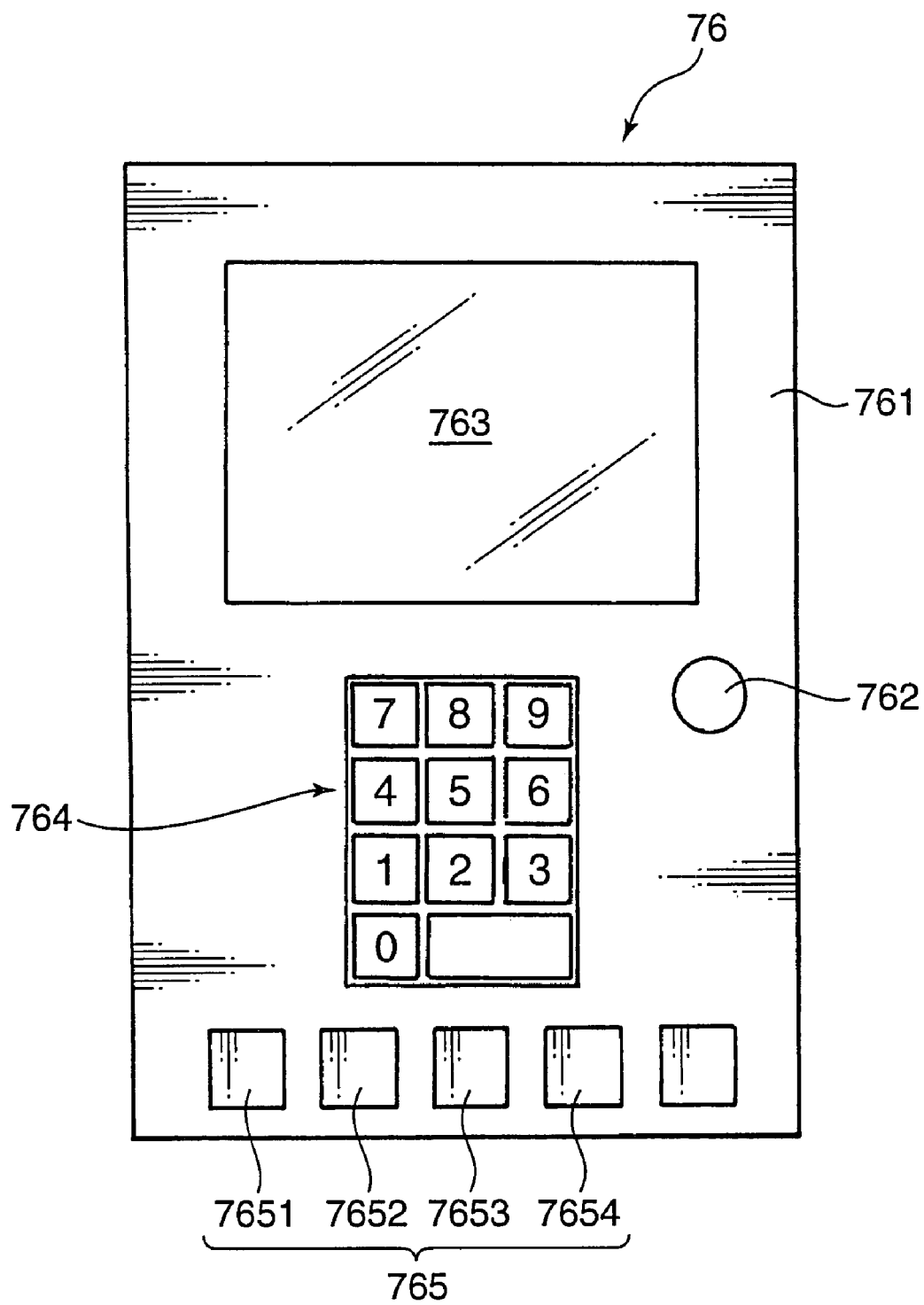
FIG. 6 is an outside view showing an exemplary console panel.

FIG. 6 is an outside view showing an exemplary console panel 76. As shown in FIG. 6, the console panel 76 has a housing 761 in the shape of a flat square prism. The console panel 76 has a power supply switch 762 provided in the center portion on the right edge of FIG. 6. Also, an LCD (liquid crystal display) 763 as display means is provided in the upper portion and a numeric keypad 764 to input various kinds of numerical data is provided in the lower portion. Further, an operation information input key 765 to input various kinds of operating information is provided at a portion directly below the numeric keypad 764.

The control device 70 is configured in such a manner that it starts up when the power supply switch 762 is depressed and supplies specific power from the power supply device 54 (FIG. 2) to wherever necessary (the high-frequency oscillator 50, the driving motor 24, and so forth) in the high-frequency thawing apparatus 10.

The LCD 763 displays input information from the operating information input key 765 and the numeric keypad 764 as well as output information regarding the control from the operating condition setting portion 711 or the like. The operator, by visually confirming the content displayed on the LCD 763, becomes able to check the information that is just inputted and confirm the operating status of the high-frequency thawing apparatus 10.

The operating information input key 765 includes at least a food kind key 7651 to input the kind of frozen materials R, a food dimension key 7652 to input three dimensions (lengthwise dimension × crosswise dimension × height dimension) of the frozen materials R, a numerical quantity key 7653 to input a numerical quantity of frozen materials R subjected to the thawing processing, and a weight key 7654 to input the weight of the frozen materials R.

In a case where the kind of frozen materials R is inputted, when the food kind key 7651 is depressed, a message, "input the kind of frozen materials using numeric keypad", is displayed on the LCD 763, and the operator is requested to input a numerical character specifying the corresponding pre-encoded kind of food. In a case where the three dimensions of the frozen materials R is inputted, after the food dimension key 7652 is depressed, the operator is allowed to input numerical values of the length, width, and height using the numeric keypad 764. Also, in a case where the numerical quantity of the frozen materials R subjected to the thawing processing is inputted, the numerical quantity key 7653 is depressed, after which the operator is allowed to input the numerical quantity using the numeric keypad 764. Further, in a case where the weight of the frozen materials R is inputted, after the weight key 7654 is depressed, the operator is allowed to input the weight using the numeric keypad 764.

In addition to the input direction using the numeric keypad 764 as described above, item keys assigned to the respective kinds of food to be thawed (for example, beef: key A, pork: key B, chicken: key C) may be provided so that the dimension and weight of an item are automatically inputted by merely depressing any of the item keys. In the case of the configuration described above, because the frozen materials R have the dimension and the weight rated for each kind, by pre-storing these in the control device 70 described below, it is possible to eliminate the need of a bothering work to input the dimension and the weight using the numeric keypad 764 each and every time. It is thus possible to enhance the workability relating to operations of the high-frequency thawing apparatus 10.

In order to support input operations from the operating information input key 765, a food code correspondence table in which, for example, the kinds of the frozen materials R and the code numbers are correlated with each other, is stored in the ROM 72, so that when the food kind key 7651 is depressed, the food code correspondence table is read out and displayed on the LCD 763. The operator is therefore able to perform input operations with ease using the numeric keypad 764 by referring to the food code correspondence table displayed on the LCD 763.

The operating condition setting portion 711 is adapted for setting the operating conditions of the high-frequency thawing apparatus 10 on the basis of the input information from the console panel 76. More specifically, it is configured in such a manner that when the kind of the frozen materials R is inputted by the depressing operations on the food kind key 7651 and the numeric keypad 764, an output of the high-frequency oscillator 50 is done on the basis of the kind thus inputted, and when the three dimensions of the frozen materials R is inputted by the depressing operations on the food dimension key 7652 and the numeric keypad 764, the height level of the top electrode 31 is done on the basis of the dimension thus inputted. The operating conditions set by the operating condition setting portion 711 are outputted to the control signal output portion 712 described below in the form of a command signal requesting to output a control signal.

For the operating condition setting by the operating condition setting portion 711, the ROM 72 has stored a food kind table 721 in which the kinds of the frozen materials R and the three dimensions of the frozen materials R are correlated with a high-frequency output from the high-frequency oscillator 50 and a time pitch of the carrying belt 23 driven intermittently. The operating condition setting portion 711 is configured to set an output value of the high-frequency oscillator 50 and a time pitch of the carrying belt 23 driven intermittently on the basis of the input information from the operating information input key 765 and the numeric keypad 764 with reference to the food kind table 721.

Meanwhile, input information from the numerical quantity key 7653 and the numeric keypad 764 (that is, the numerical quantity of the frozen materials R subjected to the thawing processing) is stored temporarily in the RAM 73 until the thawing processing is completed for the input numerical quantity of frozen materials R. The numerical quantity is managed on the basis of a set numerical quantity stored in the RAM 73. In order to manage the numerical quantity, a count sensor 74 to detect a count of the frozen materials R to which the thawing processing has been applied is provided at the downstream end of the apparatus main body 11, and an accumulated count storage portion 731 is provided to the RAM 73, so that each time the count sensor 74 detects a frozen material R done with the thawing processing, the detected count is added to the numerical quantity stored in the accumulated count storage portion 731.

The operating condition setting portion 711 is configured to compare the count accumulated in the accumulated count storage portion 731 with the set count each time the count sensor 74 detects a frozen material R, and when the accumulated count reaches the set count, to output a command signal requesting to stop the thawing processing to the control signal output portion 712.

Also, it is configured in such a manner that the operating conditions set by the operating condition setting portion 711 are displayed on the LCD 763 to enable the operator to confirm whether the operating conditions thus set are correct.

The control signal output portion 712 outputs control signals to the high-frequency oscillator 50, the driving motor 24, the first valve gear 611, and the second valve gear 621 according to the command signal from the operating condition setting portion 711, so that operations of the high-frequency thawing apparatus 10 are controlled concretely through appropriate driving of the high-frequency oscillator 50 and the driving motor 24 and appropriate valve operations of the first and second valve gears 611 and 621.

The control signal output portion 712 is configured to output a control signal requesting to output high-frequency waves at an adequate output corresponding to the kind and the three dimensions of the frozen materials R according to the command signal from the operating condition setting portion 711 to the high-frequency oscillator 50, and to output a control signal requesting to turn around the carrying belt 23 intermittently at a specific time pitch (in specific cycles) corresponding to the kind and the three dimensions of the frozen materials R to the driving motor 24.

Further, the control signal output portion 712 is configured to output a control signal requesting to open and close the carry-in port 14 and the carry-out port 15 by the driving of the opening and closing air cylinders 171 corresponding to the intermittent turning of the carrying belt 23 to the first valve gear 611, and to output a control signal requesting to move up and down the top electrode 31 by the driving of the elevation air cylinders 421 corresponding to the intermittent turning of the carrying belt 23 to the second valve gear 621.

It is configured in such a manner that these various kinds of control signals from the control signal output portion 712 are outputted in an associated manner. Hence, when the operation of the high-frequency thawing apparatus 10 is started, the carrying belt 23 is suspended first, and the carry-in port 14 and the carry-out port 15 are opened by the driving of the opening and closing air cylinders 171 while the top electrode 31 is set at an upper position. Three frozen materials R from the upstream process are arrayed side by side in the width direction at the upstream end of the carrying belt 23 in this state, and subsequently, the three frozen materials R are carried into the first thawing space V1 through the carry-in port 14 with a turn at one pitch of the carrying belt 23 by the driving of the driving motor 24. The top electrode 31 is then set at a lower position at a specific height level according to the dimension of the frozen materials R by the driving of the elevation air cylinders 421 while the carry-in port 14 and the carry-out port 15 are closed, so that the three frozen materials R are sandwiched between the unit electrodes 302 for the first top electrode group in the first top electrode group 32 and the bottom electrode 35.

In this instance, following three frozen materials R are placed on the upstream end of the carrying belt 23. High-frequency power from the first oscillator 51 is supplied to the first top electrode group 32 in this state for a specific time, and the thawing processing is executed on the first three frozen materials R in the first thawing space V1 with the application of the high-frequency power. When the application of the high-frequency power to the frozen materials R for the specific time is completed, the carry-in port 14 and the carry-out port 15 are opened, and at the same time, the top electrode 31 is moved up toward the upper position. The following three frozen materials R are carried into the first thawing space V1 by a turning at one pitch of the carrying belt 23 in this state, and the same operation as above is continuously performed. Accordingly, the thawing processing on the three new frozen materials R is started and the thawing processing is applied to the first three frozen materials R within the first thawing space V1 at a position advanced by one pitch.

As such operations are performed repetitively, frozen materials R, three at a time, are successively carried into the thawing space V of the apparatus main body 11 correspondingly to an intermittent turning of the carrying belt 23. The frozen materials R carried into the thawing space V are then subjected to the thawing processing three times each over a specific time within the first thawing space V1, and after the curing processing is executed two times each over a specific time, the thawing processing by high-frequency application from the unit electrodes 303 for the second top electrode group is executed six times each over a specific time within the second thawing space V2. After the curing processing is continuously executed two times each over a specific time, the thawing processing by high-frequency application from the unit electrodes 304 for the third top electrode is executed ten times each over a specific time within the third thawing space V3. The frozen materials R are then carried out to the outside via the carry-out port 15.

As described above in detail, the high-frequency thawing apparatus 10 of this embodiment applies the thawing processing to the frozen materials R by means of dielectric heating by applying high-frequency waves from the high-frequency oscillator 50 to the frozen materials R via the opposing electrodes while they are sandwiched between the top electrode 31 and the bottom electrode 35, which is a space between opposing electrodes in the shape of a flat plate. The high-frequency thawing apparatus 10 of this embodiment has plural sets of plate-shaped opposing electrodes (in the embodiment above, three sets: the first top electrode group 32 and the bottom electrode 35, the second top electrode group 33 and the bottom electrode 35, and the third top electrode group 34 and the bottom electrode 35) used sequentially to thaw the frozen materials R. The unit electrodes 302 for the first top electrode group in the first top electrode group 32 used firstly for the thawing are made to have a smaller area than the area of the surface of the frozen material R opposing the electrodes. The unit electrodes 303 for the second top electrode group in the second top electrode group 33 used secondly for the thawing are made to be larger than the area of the unit electrodes 302 for the first top electrode group. The unit electrodes 304 for the third top electrode group in the third top electrode group 34 used thirdly for the thawing are made to be larger than the area of the unit electrodes 303 for the second top electrode group.

According to the configuration described above, by setting the unit electrodes 301 (unit electrodes 302 for the first top electrode group) used for the first top electrode group 32 on the uppermost stream end to be smaller than the area of the frozen material R, the top electrode 31 is able to thaw only the inside of the frozen material R at the initial stage of the thawing processing because the crest edge portion of the frozen material R is not subjected to high-frequency heating by avoiding transmission of energy of high-frequency waves. It is thus possible to eliminate the inconvenience that the temperature distribution becomes inhomogeneous due to the overheating in the crest edge portion of the frozen material R at the initial stage of the thawing processing, which results in poor thawing.

Because the top electrode 31 in the second set and thereafter (the unit electrodes 303 for the second top electrode group and the unit electrodes 304 for the third top electrode group) are made to have areas that become larger stepwise than the area of the proceeding electrodes, a ratio of the crest edge portion of the frozen material R covered by the electrodes increases each time the high-frequency thawing processing is performed between the opposing electrodes, and the crest edge portion is more readily heated step-by-step by the high-frequency waves.

Hence, by properly setting the number of sets of the opposing electrodes to be adopted and an increase of the opposing areas of the opposing electrodes to suit the situation, it is possible to thaw the frozen material R in a uniform state having no noticeable variance in the thawing temperature at the respective portions.

An amount of energy of high-frequency power supplied to the respective electrodes is made to be smaller stepwise from the first top electrode group 32 to the second top electrode group 33 and to the third top electrode group 34. Hence, an amount of energy supplied to the frozen material R in response to a rise in temperature of the frozen material R is lessened with a progress of the thawed state. Hence, not only is it possible to avoid an inconvenience that the temperature rises abruptly with a progress in the thawing processing, but it is also possible to achieve more uniform thawing processing by letting the effect of the heat transmission function be exerted inside the frozen material R with a progress in the thawing processing.

In the embodiment described above, the carrying belt 23 stretched over the drive roller 21 and the driven roller 22 and carrying the frozen materials R by turning around is provided, and it is configured in such a manner that the thawing processing is executed by applying high-frequency waves to the frozen materials R while the frozen materials R are being carried on the carrying belt 23. This makes it possible to apply the thawing processing to the frozen materials R in series, so that the thawing processing for the frozen materials R can be performed effectively on an industrial scale.

The high-frequency oscillator 50 having the same output is used in a plural form (in the embodiment described above, three oscillators: the first through third oscillators 51, 52, and 53 from upstream to downstream). The areas of the unit electrodes 301 to which is applied high-frequency power from the first through third oscillators 51, 52, and 53 are increased toward the downstream end, while the number of unit electrodes 301 to which is applied high-frequency power from one high-frequency oscillator 50 is increased according to the size thereof. An amount of energy applied to a single unit electrode 301 is therefore reduced toward the downstream end. Hence, by adopting plural high-frequency oscillators 50 having the same output, it is possible to achieve an event that an amount of energy conferred to the frozen material R is lessened to prevent partial overheating with an increase of the opposing area. In comparison with a case where plural oscillators having different outputs are adopted, the overall configuration including the operation control can be simpler, which can in turn contribute to a reduction of the equipment costs.

It should be appreciated that the invention is not limited to the embodiment described above, and it is understood that the invention covers the following modifications.

(1) In the embodiment described above, three oscillators, the first through third oscillators 51, 52, and 53, are adopted as the high-frequency oscillator 50. The invention, however, is not limited to the configuration in which three high-frequency oscillators 50 are provided, and less than three oscillators may be adopted as well depending on the situation, or alternatively, four or more oscillators may be adopted.

(2) In the embodiment described above, the top electrode 31 is divided into three parts: the first through third top electrode groups 32, 33, and 34. The invention, however, is not limited to the configuration in which the top electrode 31 is divided into three parts, and the top electrode 31 may be divided into two parts or four or more parts.

(3) In the embodiment described above, the bottom electrode 35 serving as the electrode on the ground side is made to have quite a large dimension. The invention, however, is not limited to the configuration in which the bottom electrode 35 is made to have a large dimension. It may be configured in such a manner that the bottom electrode 35 is made to have a smaller dimension than the frozen material R while the top electrode 31 is made to have a larger dimension than the frozen material R. Alternatively, both of the top electrode 31 and the bottom electrode 35 may be made to have smaller dimensions than the frozen material R.

(4) In the embodiment described above, the thawing processing is executed by high-frequency application while the frozen materials R are carried by a turning of the carrying belt 23. Instead of this configuration, for example, a method of loading the frozen material R in a space between the top electrode 31 and the bottom electrode 35 by an action of the robot arm may be adopted.

(5) In the embodiment described above, high-frequency power is applied to the frozen materials R successively from the unit electrodes 302 for the first top electrode group, the unit electrodes 303 for the second top electrode group, and the unit electrodes 304 for the third top electrode group, which are made to have areas that become larger stepwise, while the frozen materials R are carried on the carrying belt 23. However, instead of this configuration, a frozen material stationary method may be adopted, by which the frozen material R is placed on the bottom electrode 35 so as to remain stationary, and the smaller top electrode is replaced by the larger top electrode in order for the frozen material R in a stationary state.

FIG. 9 is a perspective explanatory view showing a high-frequency thawing apparatus 10' of a first embodiment adopting the frozen material stationary method. FIG. 9A shows a state where a first top electrode 311 alone is placed oppositely to the frozen material R at a specific interval. FIG. 9B shows a state where the first top electrode 311 and a second top electrode 312 are placed oppositely to the frozen material R at a specific interval. FIG. 9C shows a state where the first top electrode 311, the second top electrode 312, and a third top electrode 313 are placed oppositely to the frozen material R at a specific interval.

As shown in FIG. 9, the high-frequency thawing apparatus 10' of the first embodiment adopting the frozen material stationary method includes: the first top electrode 311 serving as a top electrode 31' and exhibiting an almost elliptical shape; the second top electrode 312 exhibiting an annular shape and externally fit to the first top electrode 311 while the inner peripheral edge surface thereof comes into sliding contact with the outer peripheral edge surface of the first top electrode 311; and the third top electrode 313 exhibiting an annular shape and externally fit to the second top electrode 312 while the inner peripheral edge surface thereof comes into sliding contact with the outer peripheral edge surface of the second top electrode 312. The area of the inner side of the outer peripheral edge surface of the third top electrode 313 is made to be slightly smaller than the area of the top surface of the frozen material R.

In addition, a cylinder device 43 to move up and down these first through third top electrodes 311, 312, and 313 is provided. The cylinder device 43 is formed of a first cylinder device 431 for the first top electrode 311, a second cylinder device 432 for the second top electrode 32, and a third cylinder device 433 for the third top electrode 313.

In order to apply the thawing processing to the frozen material R, as shown in FIG. 9A, the first top electrode 311 is firstly moved down by the driving of the first cylinder device 431 for the first top electrode 311 to oppose the top surface of the frozen material R at a specific interval. In this state, a first step of the thawing processing is executed by high-frequency application via the first top electrode 311.

Subsequently, when a specific time has passed in the first step of the thawing processing, the second top electrode 312 is moved down by the driving of the second cylinder device 432. Then, as shown in FIG. 9B, the top surface of the frozen material R is brought into a state where it opposes the first top electrode 311 and the second top electrode 312 at a specific interval. In this state, a second step of the thawing processing is executed by applying high-frequency waves to the frozen material R via the first and second top electrodes 311 and 312.

When the second step of the thawing processing over a specific time is completed, the third top electrode 313 is moved down lastly by the driving of the third cylinder device 433. The frozen material R is thus brought into a state where it opposes the first through third top electrodes 311, 312, and 313. In this state, high-frequency application over a specific time via the first through third top electrodes 311, 312, and 313, which is a third step of the thawing processing, is performed on the frozen material R.

According to the high-frequency thawing apparatus 10' of the first embodiment adopting the frozen material stationary method configured as above, there is no need to move the frozen material R except when it is attached to and removed from the bottom electrode 35, a contribution can be made to a reduction of the equipment costs.

Figure 10A:
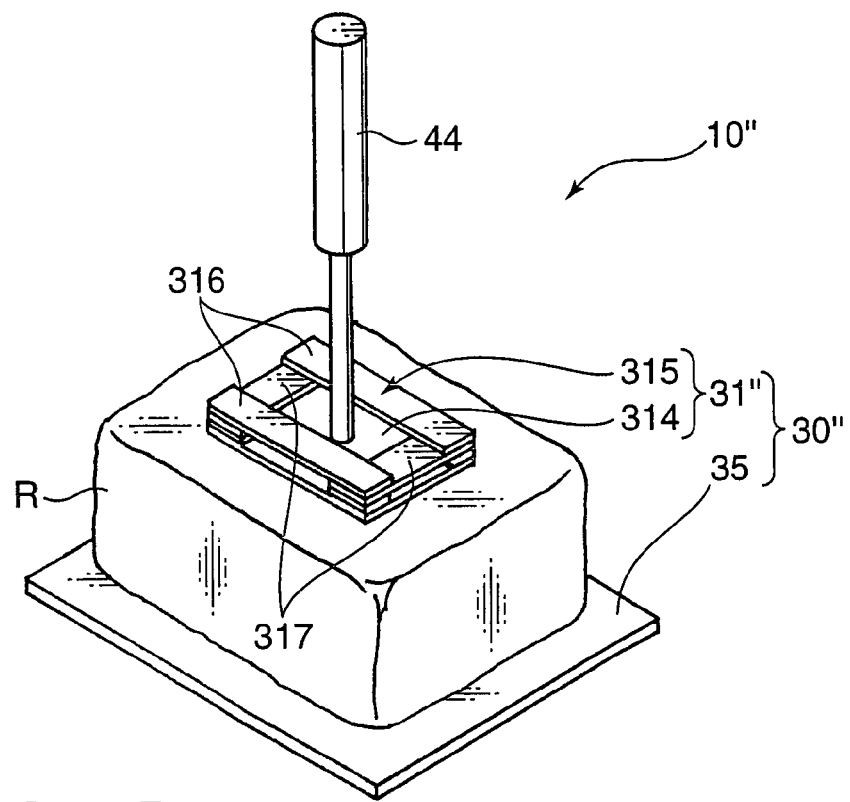
FIG. 10A is a perspective explanatory view showing a state where the first top electrode alone is placed oppositely to a frozen material at a specific interval in the high-frequency thawing apparatus of a second embodiment adopting the frozen material stationary method.
Figure 10B:
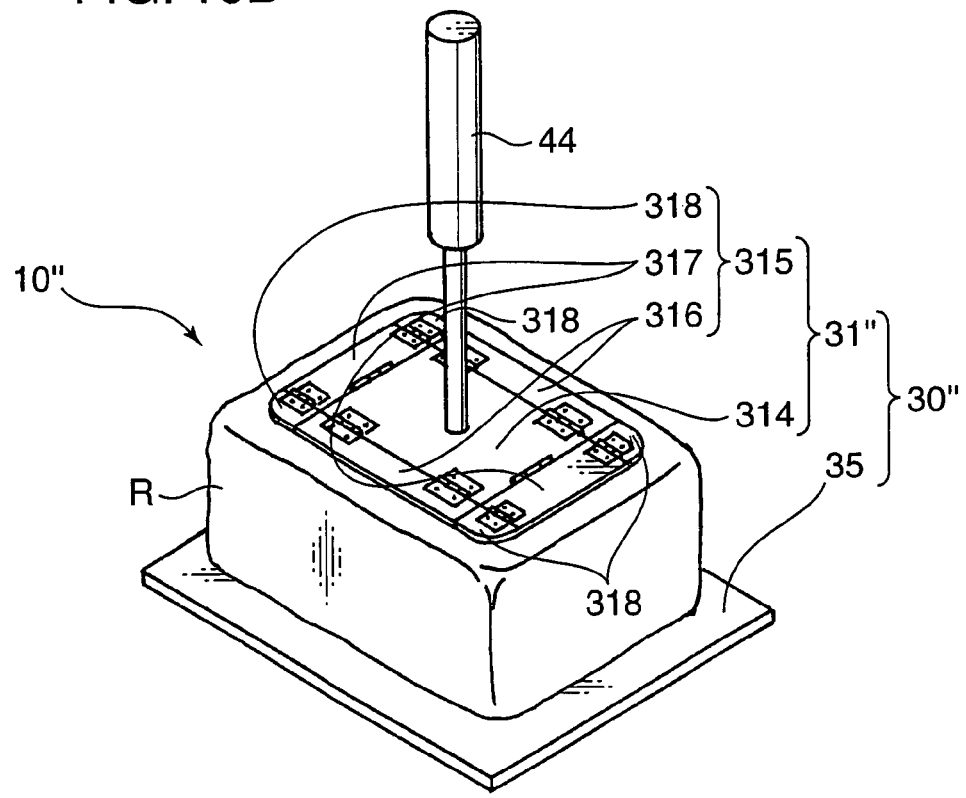
FIG. 10B is a perspective explanatory view showing a state where the first top electrode and the second top electrode are placed oppositely to the frozen material at a specific interval in the high-frequency thawing apparatus of the second embodiment adopting the frozen material stationary method.

FIG. 10 is a perspective explanatory view showing a high-frequency thawing apparatus 10" of a second embodiment adopting the frozen material stationary method. FIG. 10A shows a state where a first top electrode 314 alone is placed oppositely to the frozen material R at a specific interval. FIG. 10B shows a state where the first top electrode 314 and a second top electrode 315 are placed oppositely to the frozen material R at a specific interval.

As shown in FIG. 10, a top electrode 31" of opposing electrodes 30" in the second embodiment adopts an electrode of a folding type. As shown in FIG. 10B, the top electrode 31" is formed of the first top electrode 314 exhibiting a rectangular shape and the second top electrode 315 provided to be foldable on the respective side portions of the first top electrode 314.

The second top electrode 315 is formed of a pair of first plate pieces 316 connected to corresponding edge portions of the first top electrode 314 via specific hinge members, a pair of second plate pieces 317 connected to the other opposing edge portions of the first top electrode 314 via specific hinge members, and a pair of third plate pieces 318 connected to the opposing edge portions of the respective second plate pieces 317 via specific hinge members.

The first through third plate pieces 316, 317, and 318 are made to have dimensions so that when they are in a folded state, they are accommodated on the first top electrode 314 by overlapping one on another as shown in FIG. 10A, and when they are developed, as shown in FIG. 10B, they form the top electrode 31" of a rectangular shape that is larger than the first top electrode 314 when viewed from above.

The elevation operation of the top electrode 31" is performed by the driving of a cylinder device 44 attached to the first top electrode 314 at the center portion thereof.

According to the top electrode 31" configured as above, by folding the second top electrode 315, the area of the top electrode 31" in the first step of the thawing processing is, as shown in FIG. 10A, the same as the area of the first top electrode 314. In the second step of the thawing processing, by developing each of the first through third plate pieces 316, 317, and 318 of the second top electrode 315, the top electrode 31" becomes larger than the first top electrode 314 as shown in FIG. 10B. It should be noted that the developing operation and the folding operation of the first through third plate pieces 316, 317, and 318 are performed manually.

According to the top electrode 31" configured as above, because the structure is quite simple, a further contribution can be made to a reduction of the equipment costs. In addition, it is suitable for the thawing processing for a small scale.

EXAMPLE 1

In order to confirm the advantage of the high-frequency thawing apparatus 10 of the invention, a block of frozen beef was adopted as a sample R1 (FIG. 7) of the frozen material R, and a test (Example) of the thawing processing in three steps was conducted on the sample R1. The size of the sample R1 was lengthwise dimension: 530 mm×crosswise dimension: 360 mm×thickness dimension: 170 mm, and the weight was about 25 kg. The measured temperature of the sample R1 was found to be at $-18.5°$ C. to $-19.5°$ C. (about $-19°$ C. in average) in the surface layer portion (10 mm deep from the surface) and $-19°$ C. to $-20°$ C. (about $-19.5°$ C. in average) in the center portion (80 mm deep from the surface).

Initially, in the first step of the thawing processing, as shown in FIG. 7A, an electrode plate 31a having the lengthwise dimension: 370 mm×crosswise dimension: 250 mm was adopted. After the sample R1 was placed on an electrode plate 35a larger than the plane dimension of the sample R1, the electrode plate 31a was overlaid on the sample R1 at the center portion thereof, and high-frequency waves from the high-frequency oscillator 50 whose output was set to 100 W/kg sample were applied for ten minutes. An amount of energy applied to the sample R1 was 1000 W min/kg.

Subsequently, in the second step of the thawing processing, as shown in FIG. 7B, an electrode plate 31b larger than the one used in the first step and having the lengthwise dimension: 420 mm×crosswise dimension: 280 mm was adopted, and after the sample R1 subjected to dielectric heating in the first step was placed on the electrode plate 35a the same as the one used in the first step, the electrode plate 31b was overlaid on the sample R1 at the center portion thereof, and high-frequency waves from the high-frequency oscillator 50 whose output was set to 80 W/kg sample were applied for 12 minutes. An amount of energy applied to the sample R1 was 960 w min/kg.

In the final third step of the thawing processing, as shown in FIG. 7C, an electrode plate 31c larger than the one used in the second step and having the lengthwise dimension: 480 mm×crosswise dimension: 320 mm was adopted. After the sample R1 subjected to dielectric heating in the second step was placed on the electrode plate 35a the same as the one used in the first step, the electrode plate 31c was overlaid on the sample R1 at the center portion thereof, and high-frequency waves from the high-frequency oscillator 50 whose output was set to 60 W/kg sample were applied for ten minutes. An amount of energy applied to the sample R1 was 600 W min/kg.

As a result, in the test of this example, energy of 2560 W min/kg in total was applied to the frozen beef used as the sample R1 in three steps.

Subsequently, three comparative tests were conducted using samples R1 prepared under the same conditions as those of Example as comparative examples for comparison with Example.

Initially, in Comparative Example 1, as shown in FIG. 8A, after the sample R1 was placed on the electrode plate 35a, the top surface thereof was covered with an electrode plate 31d set to have the lengthwise dimension: 1000 mm×the crosswise dimension: 800 mm, which was significantly larger than the sample R1, and high-frequency waves from the high-frequency oscillator 50 at an output of 50 W/kg were applied to the sample R1 for 50 minutes via the electrode. An amount of energy applied to the sample R1 in Comparative Example 1 was 2500 W min/kg.

Subsequently, in Comparative Example 2, as shown in FIG. 8B, an electrode smaller than the sample Ri and made to have the lengthwise dimension: 370 mm×the crosswise dimension: 250 mm (an electrode having the same dimension as the one shown in FIG. 7A) was used as the electrode plate 31a, and high-frequency waves from the high-frequency oscillator 50 whose output was set to 80 W/kg were applied to the sample R1 the same as the one used in Comparative Example 1 for 30 minutes. An amount of energy applied to the sample R1 in Comparative Example 2 was 2400 W min/kg.

In Comparative Example 3 conducted last, the thawing processing was applied to the same sample R1 in two steps by using the electrode plate 31a having the same size as the one used in Comparative Example 2 as shown in FIG. 8B. Initially, in the first step, high-frequency waves were applied for ten minutes at an output of 130 W/kg, and in the subsequent second step, high-frequency waves were applied for 12 minutes at an output of 80 W/kg. An amount of energy applied to the sample R1 in Comparative Example 3 was 2260 W min/kg.

The test conditions and the test results of these Example and Comparative Examples are set forth in Table 1 below. The temperature distribution (temperature distribution measured immediately after the thawing processing ended) of the sample R1 as the test result is set forth in FIG. 11. Incidentally, FIG. 11 is an explanatory view showing the temperature distribution of the sample R1 immediately after the thawing processing was completed in the form of numerical values. FIG. 11A shows the temperature distribution of Example. FIG. 11B shows the temperature distribution of Comparative Example 1. FIG. 11C shows the temperature distribution of Comparative Example 2. FIG. 11D shows the temperature distribution of Comparative Example 3. A subscript "a" written next to FIG. 11A through FIG. 11D indicates that the drawing shows the temperature distribution of the surface layer and a subscript "b" indicates that the drawings shows the temperature distribution of the center portion in the vertical direction.

TABLE 1

| | | TEST CONDITION (SAMPLE KIND. FROZEN BEEF SIZE: 530 × 360 × 170 mm WEIGHT: ABOUT 25 kg TEMPERATURE: SURFACE LAYER PORTION −18.5 to −19.5° C. CENTER PORTION −19.0 to −20.0° C.) | | | TEST RESULT (TEMPERATURE OF SAMPLE AFTER BEING THAWED) (° C.) SURFACE LAYER PORTION | |
|---|---|---|---|---|---|---|
| | | FIRST STEP | SECOND STEP | THIRD STEP | AVERAGE | DISPERSION (1σ) |
| EXAMPLE | ELECTRODE SIZE (mm) | 370 × 250 | 420 × 280 | 480 × 320 | −36 | 0.55 |
| | HIGH-FREQUENCY OUTPUT (W/kg) | 100 | 80 | 60 | | |
| | APPLICATION TIME (min) | 10 | 12 | 10 | | |
| COMPARATIVE EXAMPLE 1 | ELECTRODE SIZE (mm) | | 1000 × 800 | | −0.9 | 7.80 |
| | HIGH-FREQUENCY OUTPUT (W/kg) | | 50 | | | |
| | APPLICATION TIME (min) | | 50 | | | |
| COMPARATIVE EXAMPLE 2 | ELECTRODE SIZE (mm) | | 370 × 250 | | −4.5 | 2.27 |
| | HIGH-FREQUENCY OUTPUT (W/kg) | | 80 | | | |
| | APPLICATION TIME (min) | | 30 | | | |
| COMPARATIVE EXAMPLE 3 | ELECTRODE SIZE (mm) | 370 × 250 | 370 × 250 | | −3.5 | 3.50 |
| | HIGH-FREQUENCY OUTPUT (W/kg) | 130 | 80 | | | |
| | APPLICATION TIME (min) | 10 | 12 | | | |

TABLE 1-continued

| | | TEST RESULT (TEMPERATURE OF SAMPLE AFTER BEING THAWED) (° C.) CENTER PORTION | | |
|---|---|---|---|---|
| | | AVERAGE | DISPERSION (1σ) | REMARKS |
| EXAMPLE | ELECTRODE SIZE (mm) HIGH-FREQUENCY OUTPUT (W/kg) APPLICATION TIME (min) | −4.2 | 0.55 | DISPERSION IS THE SAME IN SURFACE LAYER PORTION AND IN CENTER PORTION, AND THAWING IS COMPLETED WITH UNIFORM TEMPERATURE DISTRIBUTION |
| COMPARATIVE EXAMPLE 1 | ELECTRODE SIZE (mm) HIGH-FREQUENCY OUTPUT (W/kg) APPLICATION TIME (min) | −0.1 | 10.52 | AVERAGE THAWING TEMPERATURE IS RELATIVELY HIGH, MOREOVER, DISPERSION IN TEMPERATURE IS EXTREMELY LARGE. TEMPERATURE OF CREST EDGE PORTION IS PARTICULARLY HIGH |
| COMPARATIVE EXAMPLE 2 | ELECTRODE SIZE (mm) HIGH-FREQUENCY OUTPUT (W/kg) APPLICATION TIME (min) | −5.9 | 2.48 | AVERAGE THAWING TEMPERATURE IS SATISFACTORY, BUT DISPERSION IS LARGE |
| COMPARATIVE EXAMPLE 3 | ELECTRODE SIZE (mm) HIGH-FREQUENCY OUTPUT (W/kg) APPLICATION TIME (min) | −6.2 | 1.86 | CENTER PORTION IS IN AN OVERHEATED STATE IN PART BECAUSE HIGH-FREQUENCY OUTPUT IS TOO HIGH |

As is set forth in Table 1, energy of nearly the same amount, 2260 W min/kg to 2560 W min/kg, was inputted to the samples R1 prepared under the same conditions in Example and Comparative Examples (in Example, the energy was the largest, 2560 W min/kg, which is disadvantageous in terms of uniform heating). In Example, the average temperature of the surface layer portion at a point in time when the thawing processing was completed is −3.6° C. and the variance (1σ) is 0.55° C., and the average temperature of the center portion is −4.2° C. and the variance (1σ) is 0.55° C., which is the same as that of the surface layer portion. It is therefore understood that the temperature distribution is uniform having an extremely small variance.

On the contrary, in Comparative Example 1, the average temperature of the surface layer portion is −0.9° C. and the variance (1σ) is 7.80° C., and the average temperature of the center portion is −0.1° C. and the variance (1σ) is 10.52° C. Hence, the temperature distribution is inhomogeneous having quite a large variance. In addition, part of the crest edge portion on the surface layer of the sample R1 becomes as high as 5.5° C. to 31.8° C. (see FIG. 11Ba) and part of the center portion becomes as high as +43.7° C. (see FIG. 11Bb). The reason is assumed to be that because the electrode plate 31d was so large to lie off from the sample R1, energy concentrated on the crest edge portion of the sample R1 and gave rise to local overheating in these portions.

In Comparative Example 2, the average temperature of the surface layer portion is −4.5° C. and the variance (1σ) is 2.27° C. and the average temperature of the center portion is −5.9° C. and the variance (1σ) is 2.48° C. It is understood that overheating in the crest edge portion on the surface layer is suppressed by making the electrode plate smaller than the sample R1; rather, the temperature becomes lower than in the center portion. The reason is assumed to be that input of energy to the crest edge portion was kept suppressed until the end.

Hence, in Comparative Example 3, application of high-frequency waves was divided into two steps, and quite large energy at an output of 130 W/kg was inputted to the sample R1 in the first step so as to rise the temperature of the crest edge portion. The average temperature of the surface layer portion is −3.7° C. and the variance (1σ) is 3.50° C. and the average temperature of the center portion is −6.2° C. and the variance (1σ) is 1.86° C. However, because the size of the electrode was kept small during the application of high-frequency waves in the second step, the center portion is hotter (see FIG. 11D).

On the contrary, in Example, application of high-frequency waves was divided into three steps, and an output of the high-frequency oscillator 50 was reduced in each step while the size of the electrode plate was increased stepwise. It is therefore confirmed that the temperature of the crest edge portion of the sample R1 can be an appropriate temperature (see FIG. 11Aa) while achieving uniform heating to the sample R1.

As has been described, a high-frequency thawing apparatus of the invention is a high-frequency thawing apparatus that executes thawing processing by means of dielectric heating by applying high-frequency power to a frozen material processed in a required thickness in a thawing section, which is characterized in that the thawing section includes: first opposing electrodes whose at least one of electrodes to sandwich the frozen material has a shape of a plate in a size smaller than a shape of a sandwiched surface of the frozen material; second opposing electrodes whose at least one of electrodes to sandwich the frozen material has a shape of a plate in a size larger than the shape of the plate in the smaller size; and a high-frequency wave supply portion that supplies the frozen material with high-frequency power via the second opposing electrodes after the high-frequency power is supplied to the frozen material via the first opposing electrodes.

Also, a high-frequency thawing method of the invention is a high-frequency thawing method for executing thawing processing by means of dielectric heating by applying high-frequency power to a frozen material processed in a required thickness in a thawing section, which is characterized in that: the high-frequency power is applied to a material to be thawed while being sandwiched between first opposing electrodes whose at least one electrode has a shape of a plate in a size smaller than a shape of a sandwiched surface of the frozen material, and the high-frequency power is continuously applied to the frozen material while being sandwiched between second opposing electrodes whose at least one electrode has a shape of a plate in a size larger than the shape of the plate in the smaller size.

The phrase, "a frozen material processed in a required thickness", means a frozen material processed to have a required thickness dimension as the target value in a state where a variance with some degree is present during the manufacturing process of the frozen food. Hence, even when irregularities and swelling or depression are present on the surface of a frozen material to some extent, the frozen material is included in the range of "a frozen material processed in a required thickness".

As described above, the frozen material supplied to the thawing section is firstly subjected to the thawing processing by the first step of dielectric heating as high-frequency power is supplied from the high-frequency wave supply portion while the frozen material is sandwiched between the first opposing electrodes. Subsequently, the frozen material is subjected to the thawing processing by the second step of dielectric heating by high-frequency application while being sandwiched between the second opposing electrodes.

The processed frozen material is formed into a three dimensional shape having a required thickness, such as a substantially square prism or a cylindrical column of a specific dimension size determined in advance. Regarding the first opposing electrodes to sandwich such a frozen material, at least one of the electrodes is made to have a shape of a plate in a size smaller than the shape of the sandwiched surface of the frozen material. Hence, at the initial stage of the thawing processing, the crest edge portion of the frozen material is subjected to the thawing processing by high-frequency heating at a lower level than in the other portions by avoiding concentration of energy of high-frequency waves. It is thus possible to eliminate an inconvenience that the crest edge portion of the frozen material is overheated at the initial stage of the thawing processing and the thawing state becomes inhomogeneous.

Regarding the second opposing electrodes used in the second step of the thawing processing, because at lest one of the electrodes has a shape of a plate in a size larger than the shape of the plate in the smaller size of the first opposing electrodes, the crest edge portion of the frozen material is covered with the opposing electrodes almost completely or in a reliable manner. The crest edge portion of the frozen material that has not been thawed sufficiently by the first opposing electrodes is more readily heated than the other portions by this configuration combined with concentration of energy of high-frequency waves. The frozen material can be therefore thawed uniformly in a state where there is no significant variance in the thawing temperature when the thawing processing by high-frequency heating is completed.

Also, it may be preferable that the high-frequency wave supply portion is configured in such a manner that amounts of applied power to the first and second opposing electrodes are almost the same.

According to this configuration, the frozen material is subjected to dielectric heating by the first and second opposing electrodes under the same high-frequency application conditions, which enables uniform thawing processing to be achieved. In addition, the control and the management of the high-frequency wave supply source can be simpler.

Also, it may be preferable that the high-frequency wave supply portion is configured in such a manner that a supplied power level to the second opposing electrodes is lower than a supplied power level to the first opposing electrodes.

According to this configuration, as the thawing processing by the first opposing electrodes shifts to the thawing processing by the second opposing electrodes, the level of the power supplied to the frozen material becomes lower with a progress in the thawed state. Hence, not only is it possible to avoid an inconvenience that the temperature of the crest edge portion rises abruptly with a progress in the thawing processing, but it is also possible to achieve more uniform thawing processing by letting the effect of the heat transmission function be exerted inside the frozen material according to a progress in the thawing processing.

Also, it may be preferable that the thawing section includes a carrier mechanism that carries the frozen material from a sandwiching position of the first opposing electrodes to a sandwiching position of the second corresponding electrodes. According to this configuration, the frozen material is automatically carried from the sandwiching position of the first opposing electrodes to the sandwiching position of the second corresponding electrodes.

Also, it may be preferable that the thawing section is provided with a curing space defined between the first opposing electrodes and the second corresponding electrodes, in which a supply of the high-frequency power to the frozen material being carried by the carrier mechanism is suspended. According to this configuration, the temperature can be made uniform through heat conduction inside the frozen material without the application of high-frequency waves.

It should be noted that means for achieving any function described in the specification is not limited to the configuration to achieve such a function as descried in the specification, and it is understood that the means includes a configuration, such as a unit and a portion, to achieve such a function.

The invention claimed is:

1. In a high-frequency thawing apparatus for thawing a frozen material having opposite surfaces of a specified size and shape, the frozen material further having a specified thickness extending between the opposite surfaces, the thawing apparatus being operative for executing a thawing processing by means of dielectric heating by applying high-frequency power, an improvement comprising a thawing section that includes:

first opposing electrodes spaced apart by a distance exceeding the specified thickness and including at least one electrode with a size and shape of a plate smaller than the specified size and shape;

second opposing electrodes spaced apart by a distance exceeding the specified thickness and including at least one electrode with a size and shape of a plate larger than the plate in the first opposing electrodes; and a high-frequency wave supply portion that supplies high-frequency power via the second opposing electrodes after the high-frequency power is supplied via the first opposing electrodes, whereby the frozen material is sandwiched between the first opposing electrodes and receives the high-frequency power supplied by the high-frequency wave supply portion and then is sandwiched between the second opposing electrodes and receives the high-frequency power supplied from the high-frequency wave supply portion.

2. The high-frequency thawing apparatus according to claim 1, wherein:
the high-frequency wave supply portion is configured in such a manner that amounts of applied power to the first and second opposing electrodes are substantially equal.

3. The high-frequency thawing apparatus according to claim 2, wherein:
the thawing section includes a carrier mechanism that carries the frozen material from a sandwiching position of the first opposing electrodes to a sandwiching position of the second corresponding electrodes.

4. The high-frequency thawing apparatus according to claim 1, wherein:
the high-frequency wave supply portion is configured in such a manner that an applied power level to the second opposing electrodes is lower than an applied power level to the first opposing electrodes.

5. The high-frequency thawing apparatus according claim 4, wherein:
the thawing section includes a carrier mechanism that carries the frozen material from a sandwiching position of the first opposing electrodes to a sandwiching position of the second corresponding electrodes.

6. The high-frequency thawing apparatus according to claim 5, wherein:
the thawing section is provided with a curing space defined between the first opposing electrodes and the second corresponding electrodes, in which a supply of the high-frequency power to the frozen material being carried by the carrier mechanism is suspended.

7. The high-frequency thawing apparatus according to claim 1, wherein:
the thawing section includes a carrier mechanism that carries the frozen material from a sandwiching position of the first opposing electrodes to a sandwiching position of the second corresponding electrodes.

8. A high-frequency thawing method for executing thawing processing by means of dielectric heating by applying high-frequency power to a frozen material processed in a required thickness in a thawing section, comprising:
applying the high-frequency power to a material to be thawed while being sandwiched between first opposing electrodes whose at least one electrode has a shape of a plate in a size smaller than a shape of a sandwiched surface of the frozen material; and;
applying the high-frequency power continuously to the frozen material while being sandwiched between second opposing electrodes whose at least one electrode has a shape of a plate in a size larger than the shape of the plate in the smaller size.

* * * * *

UNITED STATES PATENT AND TRADEMARK OFFICE
CERTIFICATE OF CORRECTION

PATENT NO. : 7,470,878 B2 Page 1 of 1
APPLICATION NO. : 11/795881
DATED : December 30, 2008
INVENTOR(S) : Yasuji Yamamoto It is certified that error appears in the above-identified patent and that said Letters Patent is hereby corrected as shown below:

Title Page should read -

(86)   PCT No.:   PCT/JP2006/315861

Signed and Sealed this

Seventh Day of April, 2009

JOHN DOLL
*Acting Director of the United States Patent and Trademark Office*